United States Patent
Gavin

(10) Patent No.: US 12,539,307 B2
(45) Date of Patent: *Feb. 3, 2026

(54) ORAL CANNABINOID FORMULATION COMPRISING TOCOPHERYL PHOSPHATES AND LONG CHAIN TRIGLYCERIDES OR LONG CHAIN FATTY ACIDS

(71) Applicant: AVECHO BIOTECHNOLOGY LIMITED, Clayton (AU)

(72) Inventor: Paul Gavin, Clayton (AU)

(73) Assignee: AVECHO BIOTECHNOLOGY LIMITED, Clayton (AU)

( * ) Notice: Subject to any disclaimer, the term of this patent is extended or adjusted under 35 U.S.C. 154(b) by 490 days.

This patent is subject to a terminal disclaimer.

(21) Appl. No.: 18/249,632

(22) PCT Filed: Oct. 18, 2021

(86) PCT No.: PCT/AU2021/051211
§ 371 (c)(1),
(2) Date: Apr. 19, 2023

(87) PCT Pub. No.: WO2022/082256
PCT Pub. Date: Apr. 28, 2022

(65) Prior Publication Data
US 2023/0381207 A1 Nov. 30, 2023

(30) Foreign Application Priority Data
Oct. 19, 2020 (AU) .................. 2020903780

(51) Int. Cl.
*A61K 31/00* (2006.01)
*A61K 9/00* (2006.01)
*A61K 47/14* (2017.01)
*A61K 47/22* (2006.01)

(52) U.S. Cl.
CPC .......... *A61K 31/658* (2023.05); *A61K 9/0051* (2013.01); *A61K 47/14* (2013.01); *A61K 47/22* (2013.01)

(58) Field of Classification Search
CPC .... A61K 31/658; A61K 9/0051; A61K 47/14; A61K 47/22
See application file for complete search history.

(56) References Cited

U.S. PATENT DOCUMENTS

| | | |
|---|---|---|
| 2002/0107265 A1 | 8/2002 | Chen et al. |
| 2005/0009787 A1 | 1/2005 | West et al. |
| 2006/0241085 A1 | 10/2006 | West et al. |
| 2006/0257459 A1 | 11/2006 | West et al. |
| 2006/0281716 A1 | 12/2006 | West et al. |
| 2007/0104741 A1 | 5/2007 | Murty et al. |
| 2009/0004166 A1 | 1/2009 | West et al. |
| 2009/0005348 A1 | 1/2009 | Ogru et al. |
| 2009/0233881 A1 | 9/2009 | West et al. |
| 2009/0239827 A1 | 9/2009 | Ogru et al. |
| 2011/0092583 A1 | 4/2011 | Murty et al. |
| 2015/0110924 A1 | 4/2015 | Bromley |
| 2019/0015329 A1 | 1/2019 | El-Tamimy |
| 2019/0104750 A1 | 4/2019 | Windrix |
| 2019/0216869 A1 | 7/2019 | Salm et al. |
| 2020/0129463 A1 | 4/2020 | Lowery et al. |
| 2020/0138772 A1 | 5/2020 | Berl et al. |
| 2021/0046438 A1 | 2/2021 | Hansen |
| 2021/0069103 A1 | 3/2021 | Le Devedec et al. |
| 2021/0260143 A1 | 8/2021 | Pancurak |
| 2023/0381208 A1 | 11/2023 | Gavin |

FOREIGN PATENT DOCUMENTS

| | | | |
|---|---|---|---|
| CN | 110638756 A | 1/2020 | |
| CN | 111184690 | 5/2020 | |
| EP | 3193834 B1 | 4/2020 | |
| JP | 2013515012 A | 5/2013 | |
| WO | WO 2011/075775 A1 | 6/2011 | |
| WO | WO 2019/178360 A1 | 9/2019 | |
| WO | WO-2021046628 A1 * | 3/2021 | ........... A61K 31/658 |

OTHER PUBLICATIONS

Extended European Search Report issued in European Patent Application No. 21881369.9, dated Sep. 11, 2024.
Extended European Search Report issued in European Patent Application No. 21881370.7, dated Sep. 25, 2024.
Office Action issued in Chinese Patent Application No. 202180084972. 1, dated Jul. 7, 2025 (with English translation).
Cherniakov, I. et al., "Piperine-pro-nanolipospheres as a novel oral delivery system of cannabinoids: Pharmacokinetic evaluation in healthy volunteers in comparison to buccal spray administration," *Journal Of Controlled Release*, 266 (2017): 1-7.
Izgelov, D. et al., "The effect of medium chain and long chain triglycerides incorporated in self-nano emulsifying drug delivery systems on oral absorption of cannabinoids in rats," *International Journal of Pharmaceutics*, 580 (2020): 119201.
Libinaki, R. et al., "Changes in Bioavailability of Omega-3 (DHA) through Alpha-Tocopheryl Phosphate Mixture (TPM) after Oral Administration in Rats," *Nutrients*, 9 (2017): 1-9.
"LifeSense Product CS KetoMCT solubilizes CBD: Medium Chain Triglycerides improve bioavailability ofCBDs" Date document created Feb. 19, 2020. Retrieved from the Internet: URL: https://lifesenseproducts.com/blogs/news/lifesense-product-c8-ketomct-solubilizes-cbd [retrieved on Feb. 5, 2024].
PCT International Search Report and Written Opinion issued in International Patent Application No. PCT/AU2021/051211, mailed Jan. 18, 2022.
PCT International Preliminary Report on Patentability issued in International Patent Application No. PCT/AU2021/051211, mailed May 4, 2023.

(Continued)

*Primary Examiner* — James H Alstrum-Acevedo
*Assistant Examiner* — Manahil Mirghani Ali Abdalhameed
(74) *Attorney, Agent, or Firm* — pH IP Law

(57) ABSTRACT

The invention relates to an oral cannabinoid formulation comprising: a cannabinoid component comprising a cannabinoid; a carrier in the form of long chain triglyceride (LCT) or long chain fatty acid (LCFA); and a tocopheryl phosphate component comprising mono-(tocopheryl) phosphate (TP) and di-(tocopheryl) phosphate (T2P) wherein the mass ratio of the cannabinoid to the tocopheryl phosphate component is about 10:1 to 1:10.

20 Claims, 9 Drawing Sheets

(56) References Cited

OTHER PUBLICATIONS

PCT International Search Report and Written Opinion issued in International Patent Application No. PCT/AU2021/051212, mailed Jan. 18, 2022.

PCT International Preliminary Report on Patentability issued in International Patent Application No. PCT/AU2021/051212, mailed May 4, 2023.

Pham, A. C. et al., "A new lipid excipient, phosphorylated tocopherol mixture, TPM enhances the solubilisation and oral bioavailability of poorly water soluble $CoQ_{10}$ in a lipid formulation," *Journal of Controlled Release*, 268 (2017): 400-406.

Strickley, R. G., "Solubilizing excipients in oral and injectable formulations," *Pharmaceutical Research*, 21.2 (2004): 201-230.

Zgair, A. et al., "Dietary fats and pharmaceutical lipid excipients increase systemic exposure to orally administered cannabis and cannabis-based medicines," *American Journal of Translational Research*, 8.8 (2016): 3448-3459.

Office Action issued in Japanese Patent Application No. 2023-547723, dated Dec. 9, 2025.

\* cited by examiner

A.

B.

Figure 1 – cont.
C.
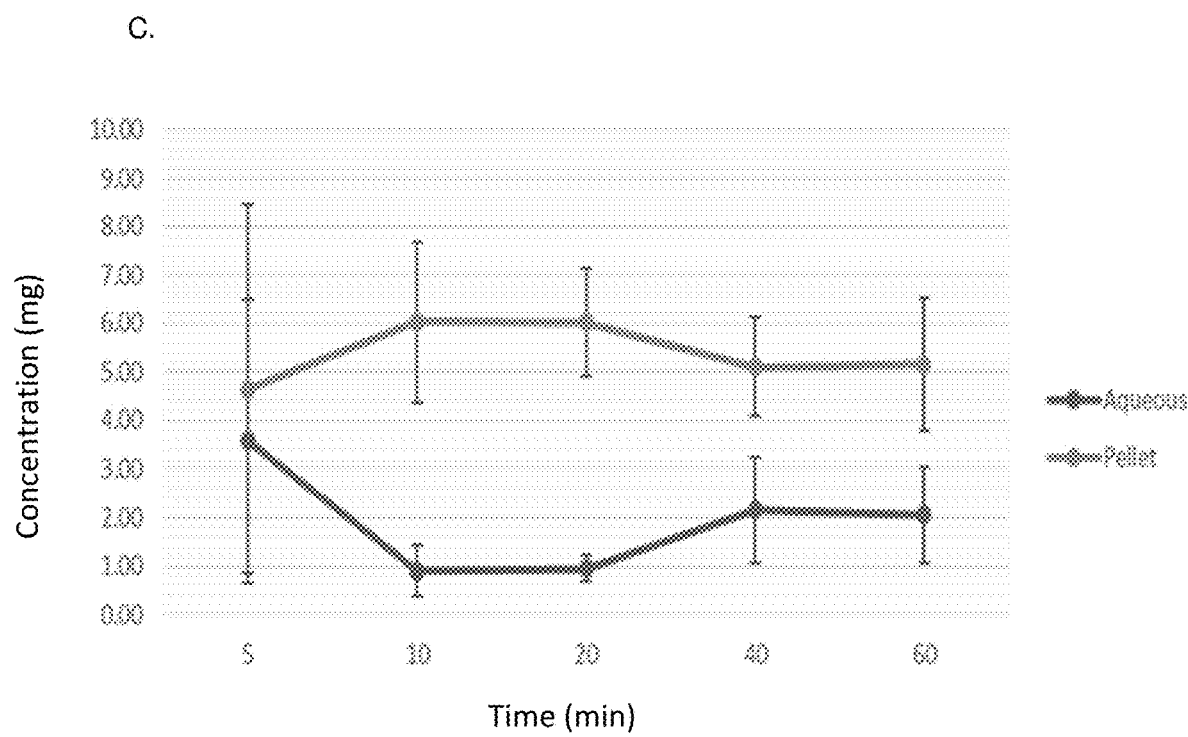

A.

B.

Figure 2 – cont.
C.
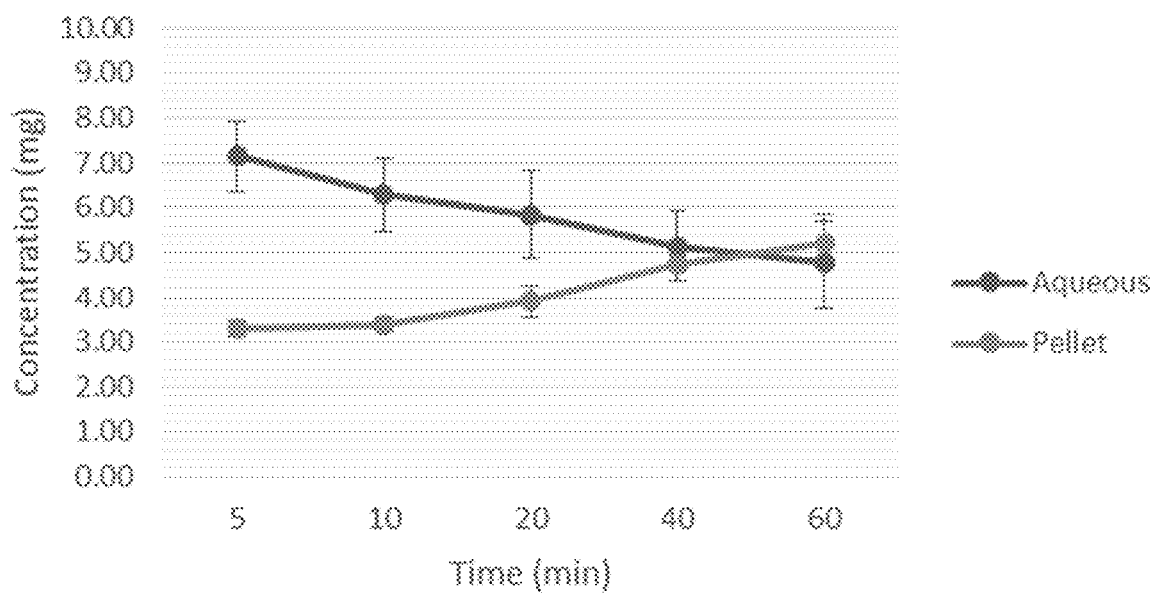

A.

B.

Figure 3 – cont.
C.
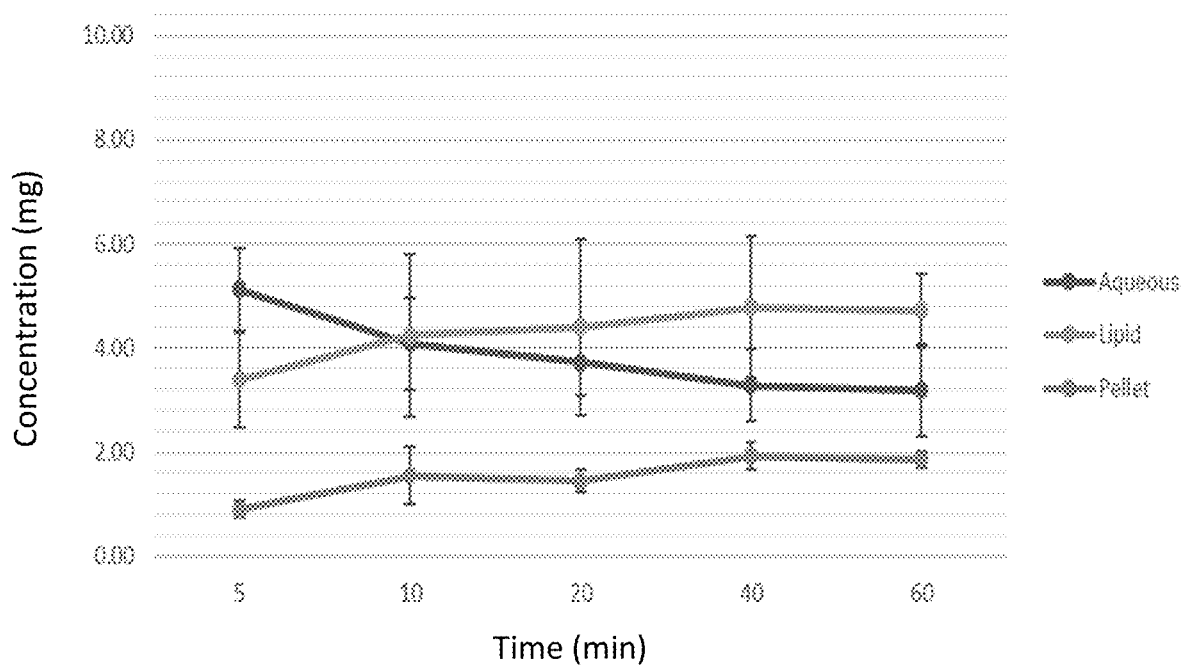

ORAL CANNABINOID FORMULATION COMPRISING TOCOPHERYL PHOSPHATES AND LONG CHAIN TRIGLYCERIDES OR LONG CHAIN FATTY ACIDS

This application is a national phase application under 35 U.S.C. § 371 of International Application No. PCT/AU2021/051211, filed Oct. 18, 2021, the entire contents of which is hereby incorporated by reference, and which claims benefit of priority of Australian Application No. 2020903780, filed Oct. 19, 2020.

FIELD OF THE INVENTION

The invention relates to oral cannabinoid formulations.

BACKGROUND OF THE INVENTION

Cannabinoids have been proposed for use for a range of conditions including pain, inflammation, anxiety, depression, insomnia, sleep disorders, lack of energy, lack of alertness, weight gain, obesity, diabetes, metabolic syndrome, nausea (acute or anticipatory), epilepsy, spasticity, schizophrenia, bi-polar disorder, cancer and neoplasia, chronic pain, osteoarthritic pain, bacterial and/or fungal infection, fibromyalgia, appetite enhancement and/or appetite suppression.

Oral administration is a preferred route for administration of cannabinoids for some of these conditions.

One problem with oral cannabinoid formulations is that they tend to have sub-optimal absorption, characterised by sub-optimal bioavailability, cMax, tMax, duration of absorption and/or area under the plasma drug concentration-time curve (AUC) for a given dose.

Sub-optimal bioavailability may arise from the poor gastric solubility and absorption of the cannabinoids and/or the $1^{st}$ or $2^{nd}$ pass metabolism of oral cannabinoid formulations subsequent to ingestion.

US2019015329A discusses an oil-in-water emulsion formulation in which a primary surfactant comprising from 1 to 30% w/w of the formulation is utilised to form a stable dispersion of a hydrophobic phase comprising an active agent in water with a tocol phosphate.

US2006281716A discusses an alkaloid formulation comprising the reaction product of one or more alkaloids with one or more phosphate derivatives of one or more electron transfer agents.

US2015110924A discusses compositions that contain a modified food starch and one or more non-polar compounds. In some instances, the compositions contain a water-soluble derivative of vitamin E mixture, containing relatively high concentrations of dimer forms of the PEG-derivative of vitamin E.

US2021260143A discusses an oil in water microemulsion comprising a water solubility agent composition designed for preparing a MCT based oil phase in water microemulsion. The water solubility agent composition is based on using sucrose ester as emulsifier and lecithin as co-emulsifier.

WO21046628A1 discusses a cannabidiol composition for use in oral delivery comprising synthetic cannabidiol (CBD) having a purity of at least 99.8 percent, together with beta-caryophyllene (BCP) which functions as both a solvent and antioxidant. The compositions further contain at least one additional lipophilic solvent (e.g. medium chain triglycerides (MCT) and coconut oil) and at least one additional antioxidant (e.g. alpha tocopherol (vitamin E)).

US2021069103A discusses self-emulsifying drug delivery systems for oral delivery of cannabinoids. The cannabinoids are dissolved in an oily medium (e.g. medium chain triglycerides) together with at least one surfactant to improve dissolution, stability, and bioavailability.

US2021046438A discusses a CBD Nano-Emulsion material and process comprises a formulation comprising at least a lecithin or mixed lecithin, one or more carrier oils, and a Vitamin E TPGS from a sunflower version and a soy version.

US2020129463A discusses cannabidiol, beta-hydroxybutyrate, related compounds, including amino acids, short chain fatty acids, short chain triglycerides, medium chain fatty acids, medium chain triglycerides, long chain fatty acids, long chain triglycerides, berberine, metabolites of berberine (e.g., dihydroberberine), and/or combinations thereof to improve the health.

US2020138772A discusses formulations comprising a stabilized, aqueous purified *cannabis* oil emulsion comprising: a) CBD and THC wherein the ratio of CBD:THC by wt/wt is from 1,050:1 to 1:1,050, and b) at least one emulsifier selected from the group consisting of Poloxamer 188, Polysorbate 80, Polysorbate 20, Vit E-TPGS (TPGS), TPGS-1000, TPGS-750-M, Solutol HS 15, PEG-40 hydrogenated castor oil, PEG-35 Castor oil, PEG-8-glyceryl capylate/caprate, PEG-32-glyceryl laurate, PEG-32-glyceryl palmitostearate, Polysorbate 85, polyglyceryl-6-dioleate, sorbitan monooleate, Capmul MCM, Maisine 35-1, glyceryl monooleate, glyceryl monolinoleate, PEG-6-glyceryl oleate, PEG-6-glyceryl linoleate, oleic acid, linoleic acid, propylene glycol monocaprylate, propylene glycol monolaurate, polyglyceryl-3 dioleate, polyglyceryl-3 diisostearate and lecithin with and without bile salts, and mixtures thereof; and the uses in the treatment of diseases.

CN110638756A discusses a preparation is prepared from the following raw materials in parts by weight: 0.1-10 parts of cannabidiol, 5-15 parts of medium chain triglyceride (MCT), 1-15 parts of soybean lecithin, 1-20 parts of gamma-cyclodextrin, 10-20 parts of glycerol-10 stearate, 10-45 parts of glycerol, and balance of distilled water. According to the preparation method, cannabidiol is prepared into the highly stable preparation through nano-encapsulation technology.

US2019104750A discusses coconut oil, coconut oil blends that are high in MCTs such as LouAna® liquid coconut oil, pure MCT oils, and Omega-3 oils may be emulsified to create an emulsified oil or blend. These oils and/or blends may be emulsified using an emulsifier that may be selected from the following: sunflower lecithin, sodium stearoyl lactylate (SSL), or a combination of sunflower lecithin and SSL.

US2007104741A discusses a self-emulsifying drug delivery system to improve dissolution, stability, and bioavailability of drug compounds of dronabinol or other cannabinoids. The drug compound(s) are dissolved in an oily medium (e.g. triglycerides and/or mixed glycerides and/or free fatty acids containing medium and/or long chain saturated, mono-unsaturated, and/or poly-unsaturated free fatty acids) together with at least one surfactant. The surfactant promotes self-emulsification, thereby promoting targeted chylomicron delivery and optimal bioavailability to a mammalian intestinal lumen.

US2002107265A discusses a pharmaceutical oil-in-water emulsions for delivery of polyfunctional active ingredients. The emulsions include an aqueous phase, an emulsifier, and an oil phase, wherein the oil phase includes a structured triglyceride that is substantially free of triglycerides having three C6-C12 fatty acid moieties, or a combination of a long chain triglyceride and a polarity-enhancing polarity modifier.

US2009005348A discusses a method of modulating one or more immuno-regulatory cytokines, such as pro-inflammatory and/or anti-inflammatory cytokines, comprising administering to a subject a therapeutically effective amount of one or more phosphate derivatives of one or more hydroxy chromans, or complexes thereof US2009239827A discusses a therapy for lowering the blood levels of a lipid selected from the group comprising LDL cholesterol, triglycerides, overall cholesterol and mixtures thereof, the therapy comprising the step of administering an effective amount of one or more phosphate derivatives of one or more electron transfer agents.

US2009233881A discusses a method for alleviating symptoms, treating or preventing cancer, the method comprising administering to a subject, having or at risk of developing cancer, a pharmaceutical formulation comprising an effective amount of one or more phosphate derivatives of one or more hydroxy chromans selected from the group consisting of 7:8 dimethyl 6 hydroxy chromans, 8 methyl 6 hydroxy chromans and mixtures thereof.

US2009004166A discusses a carrier for use in enteral administration of biologically active compounds, said carrier comprising an effective amount of one or more phosphate derivatives of one or more electron transfer agents.

US2006241085A discusses a method of inhibiting the occurrence of one of more of the following conditions:—the proliferation of monocytes/macrophages; or—the proliferation of smooth muscle cells; or—the expression of CD36 receptors; or—the uptake of oxidized LDL, the method comprising the step of administering an effective amount of one or more phosphate derivatives of one or more electron transfer agents.

US2006257459A discusses a method for improving the efficacy and/or transdermal transport of topically administered pharmaceuticals and pharmacologically active compounds, said method comprising the step of incorporating the pharmaceutical or pharmacologically active compound in a carrier comprising an effective amount of one or more complexes of a phosphate derivative of a lipophilic pharmaceutically acceptable compound.

US2005009787A discusses a dietary or health supplement comprising an effective amount of a micronutrient selected from the group consisting of phosphate derivatives of tocopherol, ubiquinol, ascorbic acid, tocotrienol, retinol and mixtures thereof delivered with an acceptable carrier.

There is a need for oral cannabinoid formulations that provide for improvements in cannabinoid bioavailability.

SUMMARY OF THE INVENTION

The invention relates to oral cannabinoid formulations, to use of same for providing improved bioavailability of cannabinoid to an individual requiring same, use of the formulations for treatment of a condition and to methods of manufacture of the oral cannabinoid formulations.

Various (enumerated) embodiments of the present invention are described herein. It will be understood that features specified in each embodiment may be combined with other specified features to provide further embodiments of the present disclosure.

Embodiment 1: An oral cannabinoid formulation, preferably a liquid formulation, more preferably a liquid oil formulation comprising:
a cannabinoid component comprising:
  a cannabinoid, preferably a synthetic cannabinoid, more preferably a synthetic cannabidiol (herein CBD) and/or synthetic tetrahydrocannabinol (herein THC), the cannabinoid in an amount to provide the oral cannabinoid formulation with a concentration of cannabinoid of about 1-250 mg, or 10-250 mg cannabinoid/ml of oral cannabinoid formulation;
  a carrier in the form of long chain triglyceride (herein LCT) or long chain fatty acid (herein LCFA), preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract;
  preferably wherein the mass ratio of cannabinoid to carrier is about 1:3 to about 1:1000 respectively, or about 1:3 to about 1:500 respectively; or about 1:3 to about 1:100 respectively; and
a tocopheryl phosphate component comprising:
  mono-(tocopheryl) phosphate (herein TP) and di-(tocopheryl) phosphate (herein T2P), preferably wherein the mass ratio of TP to T2P is about 6:4 to 82, preferably about 2:1 respectively, preferably wherein the TP and T2P are added to the formulation as acid forms of tocopheryl phosphates;
  optionally a solvent for increasing the solubility of the tocopheryl phosphates component;
and wherein the mass ratio of the cannabinoid to the tocopheryl phosphate component is about 10:1 to 1:10, preferably 5:1 to 1:5, more preferably 2:1 to 1:2; and
  optionally an aqueous component;
  optionally wherein the formulation is provided in the form of a plurality of dosage units adapted for oral administration, each dosage unit comprising an amount of cannabinoid of about 1 to 250 mg, or about 10 to 250 mg,
preferably wherein the oral cannabinoid formulation does not comprise dronabinol, or does not comprise a surfactant, or comprises less than 1% by weight alcohol.

Embodiment 2: A method for producing an oral cannabinoid formulation, preferably a liquid formulation, more preferably a liquid oil formulation, optionally further comprising an aqueous component, the method comprising the step of:
combining
  a tocopheryl phosphate component comprising:
    TP and T2P, preferably wherein the mass ratio of TP and T2P is about 6:4 to 8:2, preferably 2 to 1 respectively, preferably wherein the TP and T2P are added to the formulation as an acid form of tocopheryl phosphate;
  optionally a solvent for increasing the solubility of the tocopheryl phosphate component; with
  a cannabinoid component comprising:
    a cannabinoid, preferably a synthetic cannabinoid, more preferably a synthetic CBD and/or synthetic THC, the cannabinoid in an amount to provide the oral cannabinoid formulation with a concentration of cannabinoid of about 1-250 mg, or 10-250 mg cannabinoid/ml of oral cannabinoid formulation;

a carrier in the form of LCT or LCFA, preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract;

preferably wherein the mass ratio of cannabinoid to 1:3 to about 1:1000 respectively, or about 1:3 to about 1:500 respectively; or about 1:3 to about 1:100 respectively;

to produce an oral cannabinoid formulation comprising a cannabinoid and a tocopheryl phosphate component in a mass ratio of about 10:1 to 1:10, preferably 5:1 to 1:5, more preferably 2:1 to 1:2 respectively;

preferably wherein the oral cannabinoid formulation does not comprise dronabinol, or does not comprise a surfactant, or comprises less than 1% by weight alcohol.

Embodiment 3: A kit for producing an oral cannabinoid formulation of Embodiment 1, the kit comprising:
  a tocopheryl phosphate component comprising:
    TP and T2P, preferably wherein the mass ratio of TP and T2P is about 6:4 to 8:2, preferably 2 to 1 respectively, preferably wherein the TP and T2P are added to the formulation as an acid form of tocopheryl phosphate;
    optionally a solvent for decreasing the viscosity of the tocopheryl phosphate component;
  written instructions for utilising the tocopheryl phosphate component in the method of Embodiment 2;
  optionally
  a cannabinoid component comprising:
    a cannabinoid, preferably a synthetic cannabinoid, more preferably a synthetic CBD and/or synthetic THC, the cannabinoid in an amount to provide an oral cannabinoid formulation with a concentration of cannabinoid of about 1-250 mg or about 10-250 mg cannabinoid/ml of oral cannabinoid formulation;
  the optional cannabinoid component being separate from or combined with the tocopheryl phosphate component in the kit.

The kit of Embodiment 3 may further comprise, separate from the tocopheryl phosphate component, and the optional cannabinoid component, a carrier in the form of LCT or LCFA, preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract.

Embodiment 4: An oral cannabinoid formulation, preferably a liquid formulation, more preferably a liquid oil formulation comprising:
  a cannabinoid component comprising:
    a cannabinoid, preferably a synthetic cannabinoid, more preferably a synthetic CBD and/or synthetic THC, the cannabinoid in an amount to provide the oral cannabinoid formulation with a concentration of cannabinoid of about 1-250 mg or about 10-250 mg cannabinoid/ml of oral cannabinoid formulation;
  a carrier comprising
    LCT or LCFA, preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract;
    MCT, preferably a naturally occurring MCT extract or oil, more preferably a naturally occurring MCT extract or oil that comprises linear or branched alkyl chains comprising 12 or less carbon atoms, wherein the ratio of LCT or LCFA to MCT is from 1:3 to 3:1, preferably 1:1;
  preferably wherein the mass ratio of cannabinoid to carrier is about 1:3 to about 1:1000 respectively, or about 1:3 to about 1:500 respectively; or about 1:3 to about 1:100 respectively; and
  a tocopheryl phosphate component comprising:
    TP and T2P, preferably wherein the mass ratio of TP to T2P is about 6:4 to 82, preferably about 2:1 respectively, preferably wherein the TP and T2P are added to the formulation as acid forms of tocopheryl phosphates;
    optionally a solvent for increasing the solubility of the tocopheryl phosphates component;
and wherein the mass ratio of the cannabinoid to the tocopheryl phosphate component is about 10:1 to 1:10, preferably 5:1 to 1:5, more preferably 2:1 to 1:2; and
  optionally an aqueous component;
  optionally wherein the formulation is provided in the form of a plurality of dosage units adapted for oral administration, each dosage unit comprising an amount of cannabinoid of about 1 to 250 mg, or about 10 to 250 mg.

Embodiment 5: An oral cannabinoid formulation, preferably a liquid formulation, more preferably a liquid oil formulation comprising:
  a cannabinoid component comprising:
    a cannabinoid, preferably a synthetic cannabinoid, more preferably a synthetic CBD and/or synthetic THC, the cannabinoid in an amount to provide the oral cannabinoid formulation with a concentration of cannabinoid of about 1-250 mg, or about 10-250 mg cannabinoid/ml of oral cannabinoid formulation;
  a carrier in the form of LCT or LCFA, preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract;
  preferably wherein the mass ratio of cannabinoid to carrier is 1:3 to about 1:1000 respectively, or about 1:3 to about 1:500 respectively; or about 1:3 to about 1:100 respectively; and
  a tocopheryl phosphate component comprising:
    TP and T2P, preferably wherein the mass ratio of TP to T2P is about 6:4 to 82, preferably about 2:1 respectively, preferably wherein the TP and T2P are added to the formulation as acid forms of tocopheryl phosphates;
optionally a solvent for increasing the solubility of the tocopheryl phosphates component;
wherein the mass ratio of LCT or LCFA to tocopheryl phosphate component is from 5:1 to 250:1;
wherein the mass ratio of the cannabinoid to the tocopheryl phosphate component is about 10:1 to 1:10, preferably 5:1 to 1:5, more preferably 2:1 to 1:2; and
optionally an aqueous component;
optionally wherein the formulation is provided in the form of a plurality of dosage units adapted for oral administration, each dosage unit comprising an amount of cannabinoid of about 1 to 250 mg or about 10 to 250 mg.

Embodiment 6: A cannabinoid oil comprising
a cannabinoid;
a tocopheryl phosphate component in the form of TP and T2P;
LCT or LCFA, preferably wherein the LCT or LCFA is a naturally occurring oil or extract that has been purified or fractionated thereby increasing the relative abundance of one or more linear or branched alkyl chains comprising 13 or more carbon atoms in the oil or extract;
optionally MCT
wherein LCT or LCFA is provided in the oil in amounts to increase the cMax of the cannabinoid arising in an individual from oral administration of the oil to the individual, relative to a cMax arising in the individual from oral administration of a cannabinoid oil that comprises the tocopheryl phosphate component and that does not comprise LCT or LCFA,
preferably wherein the mass ratio of LCT or LCFA to tocopheryl phosphate in the oil is 5:1 to 250:1;
optionally wherein the mass ratio of LCT or LCFA to MCT is 1:1.

Embodiment 7: A cannabinoid oil comprising
a cannabinoid;
a tocopheryl phosphate component in the form of TP and T2P;
LCT or LCFA, preferably wherein the LCT or LCFA is a naturally occurring oil or extract that has been purified or fractionated thereby increasing the relative abundance of one or more linear or branched alkyl chains comprising 13 or more carbon atoms in the oil or extract;
optionally MCT;
wherein LCT or LCFA is provided in the oil in amounts to increase the area under the plasma drug concentration-time curve (AUC) of the cannabinoid arising in an individual from oral administration of the oil to the individual, relative to an AUC arising in the individual from oral administration of a cannabinoid oil that comprises the tocopheryl phosphate component and that does not comprise LCT or LCFA,
preferably wherein the mass ratio of LCT or LCFA to tocopheryl phosphate in the oil is 5:1 to 250:1;
optionally wherein the mass ratio of LCT or LCFA to MCT is 1:1.

Embodiment 8: A capsule for oral consumption comprising:
a cannabinoid oil comprising:
a cannabinoid, preferably a synthetic cannabinoid, more preferably a synthetic CBD and/or synthetic THC, the cannabinoid in an amount to provide the capsule with an about 1-250 mg, or about 10-250 mg cannabinoid;
wherein the cannabinoid is provided in a carrier in the form of LCT or LCFA, preferably a naturally occurring LCT or LCFA extract or oil, more preferably a naturally occurring LCT or LCFA extract or oil that comprises linear or branched alkyl chains comprising 13 or more carbon atoms, preferably wherein the LCT or LCFA is a naturally occurring oil or extract that has been purified or fractionated thereby increasing the relative abundance of one or more linear or branched alkyl chains comprising 13 or more carbon atoms in the oil or extract;
preferably wherein the carrier further comprises MCT, preferably wherein the mass ratio of LCT or LCFA to MCT is 1:3 to 3:1, more preferably 1:1;
a tocopheryl phosphate component in the form of TP and T2P, preferably wherein the mass ratio of TP to T2P is about 6:4 to 8:2, preferably about 2:1 respectively, preferably wherein the TP and T2P are added to the formulation as acid forms of tocopheryl phosphates;
wherein the mass ratio of the cannabinoid to the tocopheryl phosphate is about 10:1 to 1:10, preferably 5:1 to 1:5, more preferably 2:1 to 12;
optionally a further component selected from the group consisting of an emulsifier, a buffering agent, an aqueous solvent, an anti-oxidant and a rheology modifier,
a hydrogel, preferably gelatin for encapsulating the cannabinoid oil.

Embodiment 9: A method for providing an individual with a plasma concentration of cannabinoid, the method comprising the step of:
oral administration of a treatment formulation to an individual, the treatment formulation according to any one of Embodiments 1 or 4 to 8,
wherein the plasma concentration of cannabinoid provided in the individual by oral administration of the treatment formulation is greater than that obtained by oral administration of a control formulation, wherein the control formulation is the same as the treatment formulation but does not comprise the tocopheryl phosphate component of the treatment formulation.

Embodiment 10: A method of increasing the duration of a therapeutically effective plasma concentration of a cannabinoid in plasma of an individual, the method comprising the step of:
oral administration of a treatment formulation to an individual, the treatment formulation according to any one of Embodiments 1 or 4 to 8,
wherein the duration of a therapeutically effective plasma concentration of a cannabinoid in plasma in the individual by oral administration of the treatment formulation is greater than that obtained by oral administration of a control formulation, wherein the control formulation is the same as the treatment formulation but does not comprise the tocopheryl phosphate component of the treatment formulation.

Embodiment 11: A method for treating an individual for a condition, preferably a condition selected from the group consisting of conditions including pain, inflammation, anxiety, depression, insomnia, sleep disorders, lack of energy, lack of alertness, weight gain, obesity, diabetes, metabolic syndrome, nausea (acute or anticipatory), epilepsy, spasticity, schizophrenia, bi-polar disorder, cancer and neoplasia, chronic pain, osteoarthritic pain, bacterial and/or fungal infection, fibromyalgia, appetite enhancement and/or appetite suppression, the method comprising step of:

oral administration of a therapeutically effective amount of a cannabinoid formulation of Embodiments 1 or 4 to 8.

Embodiment 12: An oral cannabinoid formulation of Embodiments 1 or 4 to 8 for use in preventing or treating an individual for a condition, preferably a condition selected from the group consisting of conditions including pain, inflammation, anxiety, depression, insomnia, sleep disorders, lack of energy, lack of alertness, weight gain, obesity, diabetes, metabolic syndrome, nausea (acute or anticipatory), epilepsy, spasticity, schizophrenia, bi-polar disorder, cancer and neoplasia, chronic pain, osteoarthritic pain, bacterial and/or fungal infection, fibromyalgia, appetite enhancement and/or appetite suppression, preferably wherein the formulation comprises a therapeutically effective amount of a cannabinoid formulation of Embodiments 1 or 4 to 8.

Embodiment 13: A method for providing an individual with an increased cMax or AUC of a cannabinoid comprising oral administration of a cannabinoid formulation of any one of Embodiments 1 or 4 to 8 to an individual in need of said increased cMax or AUC, wherein the cMax or AUC of cannabinoid in an individual to whom a formulation of Embodiments 1 or 4 to 8 has been orally administered is increased relative to the cMax or AUC of cannabinoid arising from oral administration of a cannabinoid formulation according to the embodiment that does not comprise LCT, or that does not comprises the tocopheryl phosphate component.

DETAILED DESCRIPTION OF THE INVENTION

1. Definitions

Figure 1:
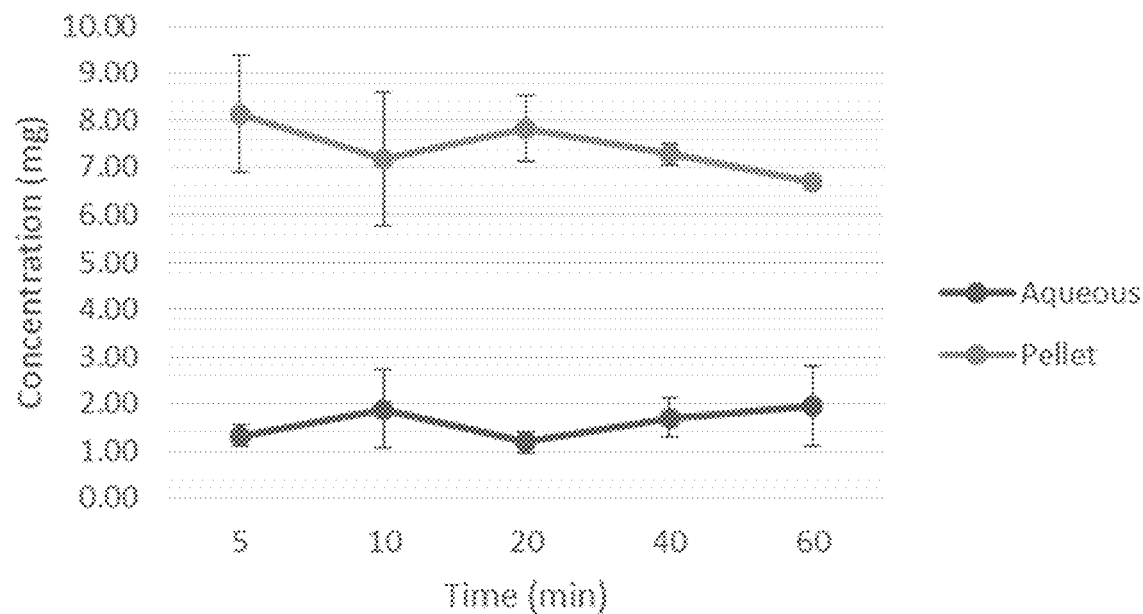
FIG. 1—Solubilisation of CBD during in vitro intestinal digestion of carrier oil (MCT, LCT/LCFA, or a mixture of MCT:LCT/LCFA) in fasted media (pH 6.5). Total lipid was 110 mg (100 mg carrier oil+10 mg CBD). Data are mean±SD, n=3. A. CBD concentration (mg) during digestion in MCT. B. CBD concentration (mg) during digestion in LCT/LCFA (Maisine CC). C. CBD concentration (mg) during digestion in a mixture of MCT:LCT/LCFA (Maisine CC)
Figure 1:
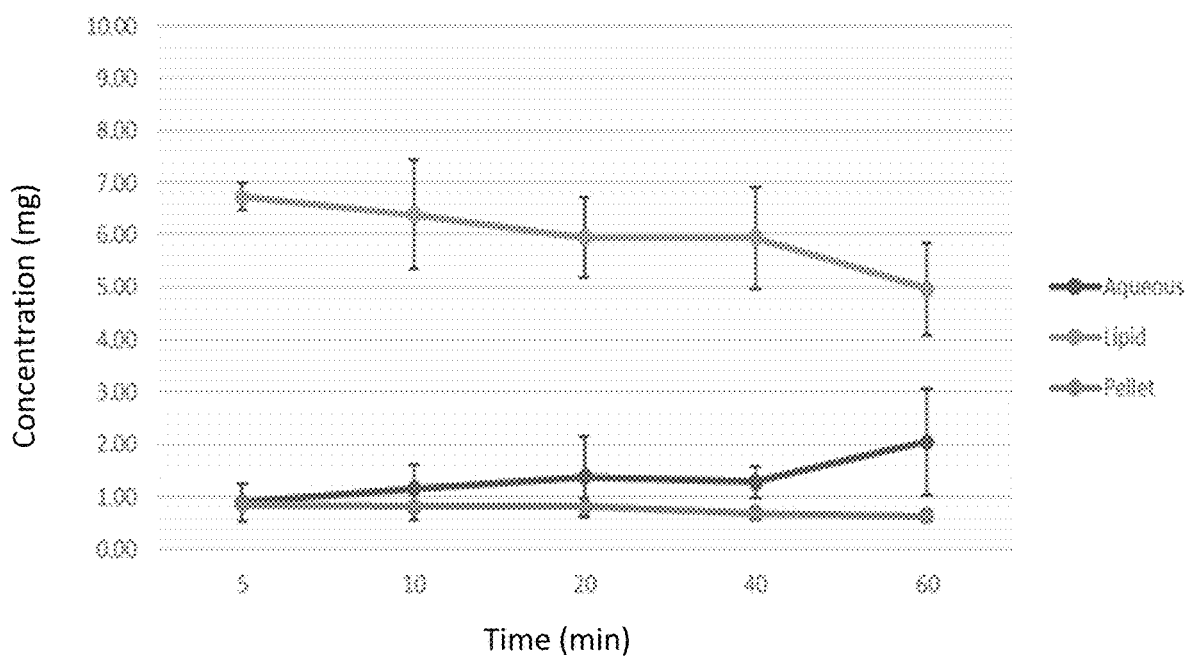

For the purpose of interpreting this specification, the following definitions will apply and whenever appropriate, terms use in the singular will also include the plural and vice versa.

As used herein, the term "about" in relation to a numerical value X means+/−10%, unless the context dictates otherwise.

As used herein, the term "pharmaceutically acceptable" means a non-toxic material that does not interfere with the effectiveness of the biological activity of the active ingredient(s).

As used herein, the term "treat", "treating" or "treatment" in connection to a disease or disorder refers in one embodiment, to ameliorating the disease or disorder (i.e., slowing or arresting or reducing the development of the disease or at least one of the clinical symptoms thereof). In another embodiment "treat", "treating" or "treatment" refers to alleviating or ameliorating at least one physical parameter including those which may not be discernible by the patient. In yet another embodiment, "treat", "treating" or "treatment" refers to modulating the disease or disorder, either physically, {e.g., stabilization of a discernible symptom), physiologically, {e.g., stabilization of a physical parameter), or both. The term "alleviating" or "alleviation", for example in reference to a symptom of a condition, as used herein, refers to reducing at least one of the frequency and amplitude of a symptom of a condition in a patient. In one embodiment, the terms "method for the treatment" or "method for treating", as used herein, refer to "method to treat".

As used herein, the term "therapeutically effective amount" refers to an amount of cannabinoid which is sufficient to achieve the stated effect. Accordingly, a therapeutically effective amount of cannabinoid will be an amount sufficient for the treatment or prevention of the relevant condition.

By "therapeutic regimen" is meant the pattern of treatment of an illness, e.g., the pattern of dosing used during the treatment of the disease or disorder.

As used herein, a subject or individual is "in need of" a treatment if such subject would benefit biologically, medically or in quality of life from such treatment. An individual is generally a mammal, typically a human, and may be a companion animal, livestock or performance animal.

The words "comprise", "comprises", "comprising" and "comprised" are used in an inclusive sense, unless the context requires otherwise.

2. Modes of Carrying Out the Invention

2.1 Formulations

The invention provides an oral cannabinoid formulation comprising:
- a cannabinoid component comprising:
  - a cannabinoid;
  - a carrier in the form of long chain triglyceride (herein LCT) or long chain fatty acid (LCFA);
- a tocopheryl phosphate component comprising:
  - mono-(tocopheryl) phosphate (herein TP) and di-(tocopheryl) phosphate (herein T2P);

wherein the mass ratio of the cannabinoid to the tocopheryl phosphate component is about 10:1 to 1:10, preferably 5:1 to 1:5, more preferably 2:1 to 1:2.

A cannabinoid may be a synthetic compound or a naturally occurring compound, for example a phyto-cannabinoid. Neutral cannabinoids include cannabigerol (CBG) and related compounds (e.g., cannabigerol monomethyl ether, cannabigerovarin); cannabichromene (CBC) and related compounds (e.g., (±)-cannabichromene, (±)-cannabichromevarin); (−)-cannabidiol (CBD) and related compounds (e.g., cannabidiol momomethyl ether, cannabidiol-C4, 20 (−)-cannabidivarin, cannabidiorcol); cannabinodiol (CBND) and related compounds (e.g., cannabinodivarin); Δ9-tetrahydrocannabinol (THC) and related compounds (e.g., Δ9-tetrahydrocannabinol-C4, Δ9-tetrahydrocannabivarin, Δ9-tetrahydro-cannabiorcol, (−)-Δ8-trans-(6aR,10aR)-Δ8-tetrahydrocannabinol, (−)-(6aS,10aR)-Δ9-tetrahydrocannabinol); cannabinol (CBN) and related compounds (e.g., cannabinol-C4, cannabivarin, cannabinol-C2, cannabiorcol, 25 cannabinol methyl ether); (±)-cannabitriol (CBT) and related compounds (e.g., (−)-(9R,10R)-trans-10-O-ethyl-cannabitriol, (±)-(9R,10R/9S,10S)-cannabitriol-C3); cannabielsoin (CBE) and related compounds (e.g., (5aS,6S,9R, 9aR)-cannabielsoin, (5aS,6S,9R,9aR)-C3-cannabielsoin, cannabiglendol-C3, dehydrocannabifuran, cannabifuran); isocannabinoids (e.g., (−)-Δ7-trans-(1R,3R,6R)-isotetrahydrocannabinol, (±)-Δ7-1,2-cis-(1R,3R,6S)-isotetrahydrocannabivarin, (±)-Δ7-1,2-cis-(1S,3S,6R)-isotetrahydrocannabivarin, (−)-Δ7 30-trans-(1R,3R,6R)-isotetrahydrocannabivarin); cannabicyclol (CBL) and related compounds (e.g., (±)-(1 aS,3aR,8bR,8cR)-cannabicyclol CBL-C5, (±)-(1aS,3aR,8bR,8cR)-cannabicyclovarin); cannabicitran (CBT) and related compounds; and cannabichromanone (CBCN) and related compounds (e.g., cannabichromanone-C3, cannabicoumaronone). Acidic cannabinoids include cannabigerolic acid A; cannabigerolic acid A monomethyl ether; cannabigerovarinic acid A; (±)-cannabichromenic acid A; (±)-cannabichromevarinic acid A; cannabidiolic acid; cannabidivarinic acid; Δ9-tetrahydrocannabinolic acid A; Δ9-tetrahydrocannabinolic acid B; Δ9-tetrahydrocannabinolic acidC4 A; Δ9-tetrahydrocannabinolic acid-C4 B; Δ9-tetrahydro-cannabivarinic acid A; Δ9 5-tetrahydrocannabiorcolic acid A; Δ9-tetrahydrocannabiorcolic acid B; (−)-Δ8-trans-(6aR,10aR)-tetrahydrocannabinolic acid A; cannabinolic acid A; (5aS,6S,9R,9aR)-cannabielsoic acid A; (5aS,6S,9R,9aR)-cannabielsoic acid B; (5aS, 6S,9R,9aR)-C3-cannabielsoic acid B; and (±)-(1aS,3aR, 8bR,8cR)-cannabicyclolic acid A.

In one embodiment, the formulation comprises a heterogenous mixture of cannabinoid compounds. Preferably the formulation comprises at least cannabidiol (herein CBD) and/or tetrahydrocannabinol (herein THC).

The cannabinoid may be provided as an extract of a naturally occurring source of cannabinoid. More preferably the extract may comprise CBD and THC. Extracts of a naturally occurring source of cannabinoid may be obtained by extraction processes known to the skilled worker for extraction of phytocannabinoids, such as alcohol extraction, $CO_2$ extraction or other solvent free extraction. An extract may take the form of an oil.

A cannabinoid may be predominantly a single compound, for example CBD or THC, as obtained by fractionation of an extract of a natural source of cannabinoid, or by cannabinoid synthesis.

A cannabinoid may be a synthetic cannabinoid such as dronabinol. In this embodiment, the oral cannabinoid formulation may not comprise a surfactant, or may not comprise more than about 1% by mass of an alcohol.

In one embodiment the cannabinoid is provided as a racemic mixture (i.e. having both D & L stereochemistries), for example as obtainable by extraction of a natural source of cannabinoid.

In one embodiment, the cannabinoid component comprises CBD in an amount of about 1 to 250 mg/ml, preferably 10 to 100 mg/ml, preferably about 75 mg/ml of the formulation.

In one embodiment, the cannabinoid component comprises THC in an amount of about 1 to 50 mg/ml, preferably about 20 to 40 mg/ml.

A cannabinoid component of the formulation may comprise CBD and THC in a ratio of about 1:1, 2:3, 4:1 or 1:20. In another embodiment the ratio of CBD to THC may be 5:1 or 10:1.

In one embodiment, the cannabinoid component may further comprise other components commonly found in a naturally derived cannabinoid product such as a terpene.

As described herein, it has been observed that long chain triglyceride appears to assist the tocopheryl phosphate component solubilise in oil, and this improved solubilisation of the tocopheryl phosphate component improves the solubilisation of cannabinoid in the gastro-intestinal environment. Further, in in vitro digestion models and an in vivo study, improvements in cMax and area under the plasma drug concentration-time curve (AUC) are observed in those oil formulations comprising LCT or LCFA. Without wanting to be bound by hypothesis it is recognised that these LCT or LCFA-mediated improvements in TPM solubilisation may underpin the observed improvements in cannabinoid cMax and AUC exemplified herein.

The LCT or LCFA may be obtained from a naturally occurring source, or it may be synthetic.

The LCT or LCFA may be provided as a naturally occurring LCT or LCFA extract or oil.

Typically, the LCT or LCFA comprises linear or branched alkyl chains comprising 13 or more carbon atoms. The LCT or LCFA may have up to 28 carbon atoms.

in one embodiment, the LCT or LCFA may be a naturally occurring oil or extract that has been purified or fractionated thereby increasing the relative abundance of linear or branched alkyl chains comprising 13 or more carbon atoms in the oil or extract. For example, the LCT or LCFA may be derived from a vegetable oil, such as corn oil. The oil is fractionated or otherwise processed so that the amount of a given fatty acid chain, for example an 18:1 (oleic) or 18:2 (linoleic) acid chain has a higher relative amount in the fractionated or processed oil than observed in the vegetable oil from which the fractionated or processed oil is derived. In a preferred embodiment the fractionated or processed oil may consist of fatty acid chains that are 18:1 and 18:2 carbon chains, or 18:1 or 18-2 carbon chains.

The LCT or LCFA may consist of saturated fatty acid chains.

The LCT or LCFA may comprise or consist of one or more fatty acid chains selected from the group consisting of myristic acid, palmitic acid, arachidic acid, behenic acid, lignoceric acid and cerotic acid.

The LCT or LCFA may consist of unsaturated fatty acid chains, for example fatty acid chains having one or more double bonds.

The LCT or LCFA may comprise or consist of one or more fatty acid chains selected from the group consisting of myristoleic acid, palmitoleic acid, sapienic acid, oleic acid elaidic acid, vaccenic acid, linoleic acid, linoelaidic acid, a-linolenic acid, arachidonic acid, eicosapentaenoic acid, erucic acid, and docosahexaenoic acid.

The LCT or LCFA may consist of a mixture of saturated fatty acid chains and unsaturated fatty acid chains, said fatty acid chains having at least 13 carbon atoms and less than 28 carbon atoms.

The LCT or LCFA may consist of a mixture of tri-, di- and mono-glycerides, or a mixture of tri- and mono-glycerides, or a mixture of tri- and di-glycerides or a mixture di- and mono-glycerides, or tri-gicyerides, or di-gicyerides, or mono-glycerides. In a preferred embodiment the LCT oil consists of tri-, di-, and mono-glycerides that comprise fatty acid chains that are 18:1 and 18:2 carbon chains, or 18:1 or 18-2 carbon chains.

LCT may be obtained from a commercial source, examples including Maisine CC, Peceol (C18:2), Gelucire 48/16, Labrafil M 1944 CS, Sterotex, BBS-C, Sesame oil, Peanut oil, as described in the examples herein.

As described herein, it has been observed that in models of in vitro gastric and intestinal digestion, a carrier that comprises long chain triglyceride and medium chain triglyceride appears to increase the solubility of cannabinoid in an aqueous phase. Further, improvements in cannabinoid cMax and AUC are observed in those oil formulations comprising LCT and MCT in an in vivo pK study. Without wanting to be bound by hypothesis, it is recognised that these improvements arise from the combination of LCT and MCT in a carrier oil component of an oil cannabinoid formulation as described in the embodiments herein.

Thus, in one embodiment, the cannabinoid component may comprise a further carrier in the form of medium chain triglyceride (MCT). The MCT may be obtained from a naturally occurring MCT extract or oil. Examples of oils include palm kernel oil and coconut milk. Typically, the MCT comprises linear or branched alkyl chains comprising no more than about 12 carbon atoms. In this embodiment, the MCT is provided in the carrier oil in a ratio of MCT to LCT of about 1:3 to 3:1, preferably 1:1.

The mass ratio of cannabinoid to carrier is about 1:3 to about 1:1000 respectively, or about 1:3 to about 1:500 respectively; or about 1:3 to about 1:100 respectively. Tocopheryl phosphate is a phosphorylated tocopherol compound, where a covalent bond is formed between an oxygen atom (typically originating from a hydroxyl group) of the tocopherol compound and the phosphorous atom of a phosphate group ($PO_4$).

The phosphorylated tocopherol compound may be a phosphate mono-ester, phosphate diester, phosphate tri-ester, pyrophosphate mono-ester, pyrophosphate di-ester, or a salt or 5 derivative thereof, or a mixture thereof.

Salts of tocopheryl phosphate may include metal salts such as alkali or alkaline earth metal salts, for example sodium, magnesium, potassium and calcium salts. Other pharmaceutically or veterinary acceptable salts of the tocopheryl phosphate may be used, such as other alkali metal salts. Other pharmaceutically acceptable salts are well known in the art, and include the acceptable salts described in detail in S. M. Berge, et al., J. Pharmaceutical Sciences, 66:1-19, 1977. Sodium and potassium salts are preferred.

The tocopheryl phosphate may be selected from, but not limited to, a mono-(tocopheryl) phosphate, a mono-(tocopheryl) phosphate monosodium salt, a mono-(tocopheryl) phosphate disodium salt, a di-(tocopheryl) phosphate, a di-(tocopheryl) phosphate monosodium salt, or a mixture thereof.

It is preferred that the TP and T2P are added to the formulation as an acid form of tocopheryl phosphate.

In particular embodiments, the composition comprises a mixture of TP and T2P in mass ratio of at about 2:1, within the range of about 4:1 to about 1:4, or within the range of about 6:4 to about 8-2. In some embodiments, the ratio is about 6:4 or about 8:2.

As described further herein, the tocopheryl phosphate component may further comprise an organic solvent, such as an alcohol, preferably ethanol, for increasing the solubility of the tocopheryl phosphate component in the cannabinoid component of the formulation.

The oral cannabinoid formulation may take the form of a liquid, solid or semi-solid. The formulation may further comprise an aqueous component, or the formulation may be mixed with an aqueous component prior to oral administration. The aqueous component may be used to introduce hydrophilic ingredients (drugs, excipients) into the formulation, or contain buffering agents to control pH.

Where the formulation further comprises an aqueous component, it may present as an emulsion, colloidal suspension or a bi-phasic solution.

In one embodiment, the formulation comprises about 2.5% or less by weight water.

The formulation may further comprise components including thickeners, gelling agents, buffers, emollients, sweeteners, disintegrators, flavours, colours, electrolytes, pH modifiers, appearance modifiers, sustained-release agents, and the like. Such additional components may be added to either of the cannabinoid or tocopheryl phosphate components, during any step during the formulation process.

The formulation may be provided in the form of a plurality of dosage units adapted for oral administration.

A dosage unit adapted for oral administration of a formulation may comprise an amount of cannabinoid of about 1 to 250 mg/ml or 10 to 250 mg/ml.

A dosage unit may be presented as a tablet, caplet, capsule or liquid adapted for oral administration such as a syrup, suspension or spray.

In one embodiment, the dosage unit is a 'gummie'. A gummie may otherwise be known as a 'gummy candy' or 'jelly sweet'. A gummie may be a gelatin-based chewable confectionery. A gummie may be sugar free or otherwise unsweetened.

In a first oil formulation embodiment there is provided a cannabinoid oil formulation for oral administration comprising: CBD (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a second oil formulation embodiment there is provided a cannabinoid oil formulation for oral administration comprising: CBD (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a third oil formulation embodiment there is provided a cannabinoid oil formulation for oral administration comprising: CBG (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a fourth oil formulation embodiment there is provided a cannabinoid oil formulation for oral administration comprising: CBG (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a fifth oil formulation embodiment there is provided a cannabinoid oil formulation for oral administration comprising: CBC (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a sixth oil formulation embodiment there is provided a cannabinoid oil formulation for oral administration comprising: CBC (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a seventh oil formulation embodiment there is provided a cannabinoid oil formulation for oral administration comprising: CBN (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In an eighth oil formulation embodiment there is provided a cannabinoid oil formulation for oral administration comprising: CBN (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a ninth oil formulation embodiment there is provided a cannabinoid oil formulation for oral administration comprising: CBND (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a tenth oil formulation embodiment there is provided a cannabinoid oil formulation for oral administration comprising: CBND (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In an eleventh oil formulation embodiment there is provided a cannabinoid oil formulation for oral administration comprising: THC (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twelfth oil formulation embodiment there is provided a cannabinoid oil formulation for oral administration comprising: THC (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a thirteenth oil formulation embodiment there is provided a cannabinoid oil formulation for oral administration comprising: THCV (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a fourteenth oil formulation embodiment there is provided a cannabinoid oil formulation for oral administration comprising: THCV (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a fifteenth oil formulation embodiment there is provided a cannabinoid oil formulation for oral administration comprising: CBGA (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a sixteenth oil formulation embodiment there is provided a cannabinoid oil formulation for oral administration comprising: CBGA (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a seventeenth oil formulation embodiment there is provided a cannabinoid oil formulation for oral administration comprising: CBT (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In an eighteenth oil formulation embodiment there is provided a cannabinoid oil formulation for oral administration comprising: CBT (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a nineteenth oil formulation embodiment there is provided a cannabinoid oil formulation for oral administration comprising: CBE (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twentieth oil formulation embodiment there is provided a cannabinoid oil formulation for oral administration comprising: CBE (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a twenty-first oil formulation embodiment there is provided a cannabinoid oil formulation for oral administration comprising: CBL (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twenty-second oil formulation embodiment there is provided a cannabinoid oil formulation for oral administration comprising: CBL (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a twenty third oil formulation embodiment there is provided a cannabinoid oil formulation for oral administration comprising: CBCN (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twenty fourth oil formulation embodiment there is provided a cannabinoid oil formulation for oral administration comprising: CBCN (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a twenty fifth oil formulation embodiment there is provided a cannabinoid oil formulation for oral administration comprising: CBDA (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twenty sixth oil formulation embodiment there is provided a cannabinoid oil formulation for oral administration comprising: CBDA (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

In a twenty seventh oil formulation embodiment there is provided a cannabinoid oil formulation for oral administration comprising: CBDV (about 10% w/w), purified or fractionated corn oil (i.e. LCT or LCFA) (about 35% w/w), MCT (about 35% w/w), TPM (7.50% w/w), tromethamine (about 1.40% w/w), water (about 2.5% w/w), lecithin (about 7.5% w/w), simethicone (about 0.02%) and butylated hydroxytoluene (about 0.2% w/w).

In a twenty eighth oil formulation embodiment there is provided a cannabinoid oil formulation for oral administration comprising: CBDV (about 1% w/w), purified or fractionated corn oil (i.e. LCT or LCFA) (about 42% w/w), MCT (about 42% w/w), TPM (about 2% w/w), tromethamine (about 1.40% w/w), water (about 2.5% w/w), lecithin (about 7.5% w/w), simethicone (about 0.02%) and butylated hydroxytoluene (about 0.2% w/w).

2.2 Capsule Formulations

In a first capsule embodiment there is provided capsule formulations, preferably soft-gel (otherwise known as 'soft gelatin') capsules comprising a cannabinoid oil formulation as described under sub-heading 2.1 above.

In a second capsule embodiment, there is provided a capsule for oral consumption comprising:
    a cannabinoid oil comprising:
        a cannabinoid;
        a carrier for the cannabinoid in the form of LCT or LCFA;
        tocopheryl phosphate component in the form of TP and T2P;
        optionally an emulsifier
        optionally a buffering agent
        optionally an aqueous solvent
        optionally an anti-oxidant
        optionally a rheology modifier.
    an outer shell comprising gelatin or a starch for encapsulating the cannabinoid oil, the outer shell preferably in the form of a soft-gel.

In the second capsule embodiment, the carrier may further comprises MCT, wherein the mass ratio of LCT or LCFA to MCT is 1:3 to 3:1, more preferably 1:1. The mass ratio of TP to T2P is about 6:4 to 8:2, preferably about 2:1 respectively, and the mass ratio of the cannabinoid to the tocopheryl phosphate is about 10:1 to 1:10, preferably 5:1 to 1:5, more preferably 2:1 to 1:2.

The emulsifier may be utilised to allow homogenous dispersion of water in the oil phase and may be selected from the group consisting of: Neutral surfactants (span and tween) phospholipids (Lecithin, Phospholipon G). The emulsifier may be provided in the minimum amounts required to form a homogenous dispersion of water in oil.

A buffering agent may be utilised to prevent cannabinoid degradation or conversion of one cannabinoid to another cannabinoid, for example to prevent conversion of CBD to THC and may be selected from the group consisting of: tromethamine, Tris, PIPES (piperazine-N,N'-bis(2-ethanesulfonic acid). The buffering agent may be provided in the minimum amounts suitable to maintain the pH of the formulation during the shelf life.

A buffering agent may also be utilised to prevent conversion of one cannabinoid to another cannabinoid and may be selected from the group consisting of: hydrolysed gelatine and pectin. The buffering agent may be provided in an amounts required to prevent ph change during shelf life An aqueous solvent may be utilised to add water soluble ingredients into the formulation. These may include additional actives or excipients, or buffering agents used to control the pH. The aqueous solvent may be provided minimum amount to dissolve the buffering agent.

An anti-oxidant may be utilised to prevent the oxidation of CBD and may be selected from butylhydroxytoluene, butylatedhydroxyanise, alpha-tocopherol. The anti-oxidant may be provided in an amounts of 0.01-5% w/w.

A rheology modifier may be utilised to prevent the precipitation of the polymeric buffering agents (gelatine, pectin) and maintain formulation homegenity and may be selected from simethicone, alginate, PVP (polyvinyl pyrrolidone). The rheology modifier may be provided in an amounts required to maintain homogeneity.

In the second capsule embodiment, preferably the cannabinoid is a synthetic cannabinoid, more preferably a synthetic CBD and/or synthetic THC, the cannabinoid in an amount to provide the capsule with an about 1-250 mg cannabinoid;

In the second capsule embodiment, preferably the LCT or LCFA is a naturally occurring LCT or LCFA extract or oil, more preferably a naturally occurring LCT or LCFA extract or oil that comprises linear or branched alkyl chains comprising 13 or more carbon atoms.

In a third capsule embodiment there is provided a capsule for oral consumption comprising:
 a cannabinoid selected from the group consisting of CBG, CBC, CBND, THC, CBN, CBT, CBE, CBL, CBT, CBCN, THCV, CBGA, CBCN, CBDA and CBDV, preferably CBD or THC;
 TPM (herein a mixture of mono-(tocopheryl) phosphate (herein TP) and di-(tocopheryl) phosphate (herein T2P))
  wherein the mass ratio of the cannabinoid to TPM is about from 2:1 to 1:2; preferably 1:1;
 MCT and LCT or LCFA
  wherein the mass ratio of MCT to LCT or LCFA is about from 3:1 to 1:3, preferably 1:1; and
  wherein the mass ratio of MCT and LCT or LCFA to cannabinoid and TPM is about 1000:3 to 10:3.

In a fourth capsule embodiment, there is provided a soft gel capsule comprising an oil formulation comprising: 75 mg CBG, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a fifth capsule embodiment, there is provided a soft gel capsule comprising an oil formulation comprising: 75 mg CBC, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a sixth capsule embodiment, there is provided a soft gel capsule comprising an oil formulation comprising: 75 mg CBND, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a seventh capsule embodiment, there is provided a soft gel capsule comprising an oil formulation comprising: 75 mg THC, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In an eighth capsule embodiment, there is provided a soft gel capsule comprising an oil formulation comprising: 75 mg CBN, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a ninth capsule embodiment, there is provided a soft gel capsule comprising an oil formulation comprising: 75 mg CBT, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a tenth capsule embodiment, there is provided a soft gel capsule comprising an oil formulation comprising: 75 mg CBE, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In an eleventh capsule embodiment, there is provided a soft gel capsule comprising an oil formulation comprising: 75 mg CBL, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a twelfth capsule embodiment, there is provided a soft gel capsule comprising an oil formulation comprising: 75 mg CBCN, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In a thirteenth capsule embodiment, there is provided a soft gel capsule comprising an oil formulation comprising: 75 mg CBD, 75 mg of TPM, 350 mg MCT, 350 mg glyceryl monolinoleate, 75 mg phospholipon 90G, 13.5 mg tromethamine, 21.1 mg purified water, 0.4 mg butylhydroxytoluene, 0.2 mg simethicone, 39.8 hydrolyzed gelatin to provide a total fill weight of 1000 mg.

In the above-described embodiments under this subheading, the outer shell may be composed of a gelatin. A gelatin matrix may comprise gelatin, plasticizer, solvent and optional ingredients such as flavors and colorants. Gelatin may arise from a bovine, porcine, or piscine (fish) origin. Gelatin may have a variety of bloom strengths, preferably a bloom strength of 150. Glycerin or sorbitol may be utilised as a plasticizer, preferably glycerin. As an alternative to gelatin, potato starch matrix may be used. Potato starch matrix is a smooth, transparent substance resembling gelatin, which is neutral in taste and color, easily digestible and of plant origin.

2.3 Bioavailability of Oral Administered Cannabinoid

A principal advantage of the invention is that it enables the oral administrative route to achieve higher plasma levels and higher AUC values of cannabinoid than could be previously obtained at the relevant dose of cannabinoid.

Without wanting to be bound by hypothesis, it is believed that the tocopheryl phosphate component of the oral cannabinoid formulation of the invention, and in particular, the TPM, assists in increasing dispersibility and solubility of cannabinoid in the gastro intestinal tract which leads to increases in bioavailability, or otherwise actuates the minimisation of $1^{st}$ pass metabolism and excretion of enterally absorbed cannabinoid. This is exemplified in the Examples described below whereby TPM is found in an in vitro model to increase the loading of cannabinoid into an aqueous medium, and to increase the plasma concentration and area under curve value of cannabinoid in an in vivo animal model.

Surprisingly it has been found that the TPM increases the bioavailability of cannabinoid.

Thus, in one embodiment there is provided a method for providing an individual with a plasma concentration of cannabinoid, the method comprising the step of:

oral administration of a formulation of one of Embodiments 1 or 4 to 8 to the individual, wherein the plasma concentration of cannabinoid provided in the individual by oral administration of the formulation of Embodiments 1 or 4 to 8 is greater than that obtained by administration of a same or similar dose of cannabinoid in a formulation that does not comprise TPM.

It is also exemplified in the PK profile assessment herein that oral cannabinoid formulations of the invention provide for an extended exposure to pharmacologically effective plasma concentration of cannabinoid. Advantageously, this allows for protection across a longer dosing cycle, which may be from 4 to 8-10 hours.

Thus, in another embodiment there is provided a method of increasing the duration of a pharmaceutically effective plasma concentration of a cannabinoid in plasma of an individual, the method comprising the step of:

oral administration of a formulation of one of Embodiments 1 or 4 to 8 to the individual, wherein the duration of a pharmaceutically effective plasma concentration of a cannabinoid in plasma of the individual by oral administration of the formulation of Embodiments 1 or 4 to 8 is greater than that obtained by administration of a same or similar dose of cannabinoid in a formulation that does not comprise TPM.

It is also exemplified herein that LCT or LCFA improves the solubility of TPM compared with the solubility of TPM in MCT. This improvement strongly predicts associated improvements in Cmax and AUC of cannabinoid in cannabinoid-containing compositions that contain TPM solubilised in LCT or LCFA, compared with cannabinoid-containing compositions that contain TPM solubilised in MCT. Thus, in one embodiment there is provided a method for providing an individual with an increased cMax or AUC of a cannabinoid. The method comprises oral administration of a formulation of Embodiments 1 and 5 to 8 that do not comprise MCT to an individual in need of said increased cMax or AUC. The cMax or AUC of cannabinoid that is ordinarily obtained from administration of an oral composition that does not comprise TPM, or that does not comprise LCT or LCFA, is used as a control to determine the quantum of increase in cMax or AUC arising from an administration of a cannabinoid oil of Embodiments 1 and 5 to 8 that do not comprise MCT. As a result of the administration, the cMax or AUC of cannabinoid in the individual is increased relative to the cMax or AUC of cannabinoid arising from oral administration of a cannabinoid-containing formulation that does not comprise LCT or LCFA, or that does not comprise TPM. The quantum of the increase is generally at least 0.25 to 20 times the control.

It is also exemplified that LCT or LCFA improves the solubility of TPM in a carrier oil that contains MCT in a ratio of about 1:1 with LCT, and that these improvements associate with improvements in Cmax and AUC of cannabinoid contained in these formulations. Thus, in one embodiment there is provided a method for providing an individual with an increased cMax or AUC of a cannabinoid. The method comprises oral administration of a formulation of Embodiments 1, or 4 to 8 to an individual in need of said increased cMax or AUC. The cMax or AUC that is ordinarily obtained from administration of an oral composition that does not comprise TPM, or that does not comprise LCT or LCFA, is used as a control to determine the quantum of increase in cMax or AUC of cannabinoid arising from an administration of a formulation of Embodiments 1 and 4 to 8. As a result of the administration, the cMax or AUC of cannabinoid in the individual is increased relative to the cMax or AUC of cannabinoid arising from oral administration of a cannabinoid oil that does not comprise LCT or LCFA, or that does not comprise TPM. The quantum of the increase is generally at least 0.25 to 40 times the control.

In one embodiment, cMax or AUC of cannabinoid may be improved by adding LCT or LCFA to an oil comprising TPM and cannabinoid, or otherwise by increasing the relative amount of LCT or LCFA in an oil comprising LCT or LCFA, TPM and cannabinoid. In another embodiment, cMax or AUC of cannabinoid may be improved by adding TPM to an oil comprising LCT or LCFA and cannabinoid, or otherwise by increasing the relative amount of TPM in an oil comprising LCT or LCFA, TPM and cannabinoid. In another embodiment, cMax or AUC of cannabinoid may be improved by adding MCT to an oil comprising LCT or LCFA, TPM and cannabinoid, or otherwise by increasing the relative amount of MCT in an oil comprising MCT, LCT or LCFA, TPM and cannabinoid. In one embodiment, cMax or AUC of cannabinoid may be improved by adding TPM to an oil comprising LCT or LCFA, MCT and cannabinoid, or by increasing the relative amount of TPM in an oil comprising LCT or LCFA, MCT, TPM and cannabinoid. Methods for measuring the plasma concentration and area under curve values of cannabinoid are known to the skilled worker. The examples herein exemplify in vitro methods and an in vivo model for assessing cannabinoid cMax and AUC in formulations containing a range of carrier oil, tocopheryl phosphate and cannabinoid values. These methods can be utilised to assess or otherwise determine improvement in cMax or AUC in cannabinoid-containing compositions arising from relative increases in the amount of one or more of TPM, LCT or LCFA, cannabinoid and optionally MCT in cannabinoid-containing formulations according to the embodiments herein.

2.4 Methods of Treatment

The improved bioavailability of oral administered cannabinoid arising from the formulations of the invention enables the treatment of a range of conditions for which cannabinoids have been suggested. As mentioned herein, some of these conditions include pain, inflammation, anxiety, depression, insomnia, sleep disorders, lack of energy, lack of alertness, weight gain, obesity, diabetes, metabolic syndrome, nausea (acute or anticipatory), epilepsy, spasticity, schizophrenia, bi-polar disorder, cancer and neoplasia, chronic pain, osteoarthritic pain, bacterial and/or fungal infection, fibromyalgia, appetite enhancement and/or appetite suppression.

Thus, in one embodiment there is provided a method of prevention or treatment of one of the above-mentioned conditions comprising the step of administering an oral cannabinoid formulation described herein, thereby preventing or treating an above-mentioned condition.

In another embodiment there is provided an oral cannabinoid formulation for use in the prevention or treatment of one of the above-mentioned conditions.

In another embodiment there is provided a use of an oral cannabinoid formulation described herein for prevention or treatment of one of the above-mentioned conditions.

In another embodiment there is provided a use of an oral cannabinoid formulation described herein, in the manufacture of a medicament for prevention or treatment of one of the above-mentioned conditions.

In a particularly preferred embodiment, the condition is insomnia or other sleep disorder. In this embodiment it is preferred that the formulation is provided in the form of a plurality of dosage units, each individual unit comprising a cannabinoid component that comprises a cannabinoid, preferably CBD or THC in amounts of about 1 to 250 mg/ml and 1-50 mg/ml respectively. The mass ratio of carrier to cannabinoid is 1:3 to 1:1000, or 1:3 to 1:500, 1:3 to 1:100. The mass ratio of TP to T2P is about 2:1, within the range of about 4:1 to about 1:4, or within the range of about 6:4 to about 82, and wherein the mass ratio of the cannabinoid to the tocopheryl phosphate component is about 10:1 to 1:10, preferably 5:1 to 1:5, more preferably 2:1 to 1:2. One or more dosage units may be orally administered to the individual from 15 minutes to 1 hour prior to sleep.

In another embodiment, the condition is episodic or chronic and selected from the group consisting of anxiety, depression, epilepsy, spasticity, schizophrenia, bi-polar disorder. In this embodiment it is preferred that the formulation is provided in the form of a plurality of dosage units, each individual unit comprising a cannabinoid component that comprises a cannabinoid, preferably CBD or THC in amounts of about 1 to 250 mg/ml and 1-50 mg/ml respectively. The mass ratio of carrier to cannabinoid is 1:3 to 1:1000, or 1:3 to 1:500, 1:3 to 1:100. The mass ratio of TP to T2P is about 2:1, within the range of about 4:1 to about 1:4, or within the range of about 6:4 to about 8-2, and wherein the mass ratio of the cannabinoid to the tocopheryl phosphate component is about 10:1 to 1:10, preferably 5:1 to 1:5, more preferably 2:1 to 1:2. This may amount to orally administering a dosage unit of the oral cannabinoid formulation to the individual every 4 to 8 hours in which case up to 4 dosage units may be given daily.

In another embodiment, the condition is acute or chronic pain which may be managed by activation of cannabinoid receptors in the individual in need of treatment. Examples include acute pain associated with trauma or surgical intervention, or chronic pain associated with inflammation, osteoarthritis, or neoplasia. In these embodiments, the oral cannabinoid formulation may be given to prevent perception of incident pain, or to manage ongoing pain. In this embodiment it is preferred that the formulation is provided in the form of a plurality of dosage units, each individual unit comprising a cannabinoid component that comprises a cannabinoid, preferably CBD or THC in amounts of about 1 to 250 mg/ml and 1-50 mg/ml respectively. The mass ratio of carrier to cannabinoid is 1:3 to 1:1000, or 1:3 to 1:500, 1:3 to 1:100. The mass ratio of TP to T2P is about 2:1, within the range of about 4:1 to about 1:4, or within the range of about 6:4 to about 8-2, and wherein the mass ratio of the cannabinoid to the tocopheryl phosphate component is about 10:1 to 1:10, preferably 5:1 to 1:5, more preferably 2:1 to 1:2. The individual may be dosed with the oral cannabinoid formulation of the invention prior to occurrence of pain, or while experiencing pain. The cannabinoid formulation is administered until the individual is no longer in need of pain relief.

The number of dosage units to be given may be determined by individual characteristics including sex, age, weight, other conditions and medications, these factors being with the purview of the skilled worker, and determinable my measuring the plasma level of cannabinoids by standard techniques, including those described above.

2.5 Methods of Manufacture

The invention provides methods for production of the oral cannabinoid formulation of the invention.

A tocopheryl phosphate component comprises TP and T2P.

The combination or mixture of TP and T2P (herein TPM), may be obtained by forming a composition of tocopheryl and $P_4O_{10}$ and heating the composition to a temperature at which an exothermic reaction occurs between the tocopheryl and $P_4O_{10}$. This temperature is referred to as an 'exotherm temperature'. At this point, the temperature of the reaction mixture is allowed to continue to rise and the reaction is completed by the formation of TP and T2P when the temperature of the reaction falls below the exotherm temperature. The phosphorylation of tocopheryl occurs at and above the exotherm temperature. The reaction products may further include poly phosphate complexes. These may be removed by hydrolysis reaction. The process is generally described in WO2018/112512.

Preferably the mass ratio of TP and T2P in the tocopheryl phosphate component is about 10:1 to 1:10, preferably 5:1 to 1:5, more preferably 2:1 to 1:2. A component comprising this ratio may be directly obtained as a product of the above described phosphorylation reaction, by modifying the amount of reaction substrate and or reaction conditions. Alternatively, or additionally, TP or T2P could be added to the product of the phosphorylation reaction to provide the preferred mass ratio of TP to T2P.

The TP and T2P reaction products arising from the above describe phosphorylation reaction are in the acid form and have a pH of about 2 to 4. These reaction products may be added to the formulation as acids, or as a salt (in which case they are neutral), although it is preferred that the reaction products are added as acids.

The mixture of TP and T2P, referred to herein as TPM, arising from the above described reaction process may have a brittle, wax-like or less malleable texture which makes working the TPM with other constituents of the tocopheryl phosphate component (if any) and the cannabinoid component more difficult. To improve the workability of the TPM, an alcohol or other organic solvent may be added to decrease the solid character of TPM. Generally, an alcohol or organic solvent is provided in no more than an amount of about 50% by weight of the tocopheryl phosphate component, or otherwise not more than about 1% by weight of the oral cannabinoid formulation.

As described above, the cannabinoid of the cannabinoid component of the oral cannabinoid formulation may be derived from a synthetic source, or from a natural source, for example a phyto-cannabinoid. It is preferred that it is provided in a form which is miscible with LCT or LCFA, and/or MCT, or dissolvable in oil. In certain embodiments, the cannabinoid may be provided in the form of a powder.

An LCT or LCFA, or MCT may be provided in a substantially unextracted form, for example, in the form of a whole oil i.e an oil that contains components derived from the LCT or LCFA source, or MCT source that are other than LCT or LCFA, or other than MCT. In certain embodiments it is preferred that LCT or LCFA is provided as an extract in which the only glycerides are long chain—i.e. generally 13 carbons or more. Highly purified extracts of LCT or LCFA are preferred and may be obtained from a variety of commercial sources as described below.

In certain embodiments where a further carrier in the form of MCT is to be used, it is preferred that MCT is provided as an extract in which the only triglycerides are medium chain—i.e. generally 12 carbons or less. Highly purified extracts of MCT are preferred and may be obtained from a variety of commercial sources.

The MCT generally acts as a carrier for the cannabinoid, which is to say that in one embodiment it bulks the cannabinoid, thereby making working with and formulating the cannabinoid easier. Thus, generally the cannabinoid is provided for use as an ingredient for production of the oral cannabinoid formulation in MCT. The mass ratio of cannabinoid to MCT is generally about 1:3 to 1:500.

Where MCT is to be provided in a formulation of an embodiment of the invention, MCT may be provided with cannabinoid solublised therein, in which case LCT or LCFA is then added to provide a formulation having a ratio of MCT to LCT or LCFA of 1:3 to 3:1, preferably 1:1. Alternatively, LCT or LCFA may be provided with cannabinoid solubilised therein and MCT is then added to provide a formulation having a ratio of MCT to LCT or LCFA of 1:3 to 3:1, preferably 1:1. In both alternatives, TPM may be added to MCT, or to LCT or LCFA. Preferably TPM is added to LCT or LCFA before LCT or LCFA is combined with MCT.

In embodiments of the manufacture process, the tocopheryl phosphate component is contacted with the cannabinoid component (comprising the carrier/cannabinoid composition) to form the oral cannabinoid composition. This may be achieved by blending the tocopheryl phosphate with the cannabinoid component.

It is important that the blending process should result in the equal and consistent distribution of the TPM throughout the cannabinoid component, ostensibly providing for dissolution of the TPM throughout the cannabinoid component.

In one embodiment, TPM and carrier may be combined and stirred with gentle heating to enable the TPM to dissolve into the carrier to form a first solution of TPM dissolved in carrier. Cannabinoid, which may be in the form of a powder, may then be added to the first solution and mixed to dissolve the cannabinoid into the first solution.

The product of the process may have a range of physical properties, depending on the properties of the tocopheryl phosphate and cannabinoid components utilised as ingredients to form the product, and the reaction conditions. Generally, the product is hydrophobic, or otherwise oil-like in nature.

In one embodiment, the product may be a liquid, such as a liquid oil, and in this form the product may require no further substantial modification, thereby taking the form of the oral cannabinoid formulation that is ready for use. In other embodiments it may be necessary to add reagents to modify viscosity (i.e. to reduce or increase viscosity), depending on whether the oral cannabinoid composition is to take a liquid, solid, or semi solid form. Viscosity modifying agents may be added to either the tocopheryl phosphate or cannabinoid components prior to blending those components to from the oral cannabinoid composition of the invention. Alternatively, these modifying agents may be added after these components have been combined.

The product of the manufacture process may be shaped or molded to form a tablet, caplet, gummie or like chewable confectionary, or suppository.

The product of the manufacture process may encapsulated, for example to form an encapsulated oil, or otherwise coated to form an enteric coating to minimise enteral degradation of the formulation.

A range of other pharmacologically accepted excipients, carriers, flavouring agents, stability modifiers can be added to the product of the manufacture process, or to the tocopheryl phosphate or cannabinoid components before those components are combined.

EXAMPLES

Example 1—Intestinal Solubility of Cannabidiol In Vitro

The concentration in the aqueous phase during intestinal digestion is often presumed to be a parameter for consideration in predicting the likely bioavailability for lipid-based formulations. Intestinal drug precipitation has been proposed as an indicator for poor bioavailability. Change in the nature of solubilising species such as micelles and vesicles in the intestinal aqueous phase is considered an important determinant of ultimate bioavailability for poorly water soluble, but sufficiently permeable drugs administered in lipid based formulations.

In vitro digestion experiments were carried out to determine whether TPM in various carrier oils could increase the intestinal aqueous solubility of CBD. These experiments utilised a model of digestion in an intestinal environment at a pH of about 6.5. From the model, one can make determinations regarding the likely solubility of CBD or other cannabinoids such as THC in an aqueous intestinal fluid.

For the digestions, the solubilisation of CBD was low in the aqueous phase when CBD was dissolved in MCT, LCT/LCFA (Maisine CC), or a mixture of MCT and Maisine CC (FIG. 1). The majority of the CBD was detected as a solid precipitate in the pellet when MCT was present, or in the immiscible oil phase for LCT/LCFA or (1C).

Figure 2:
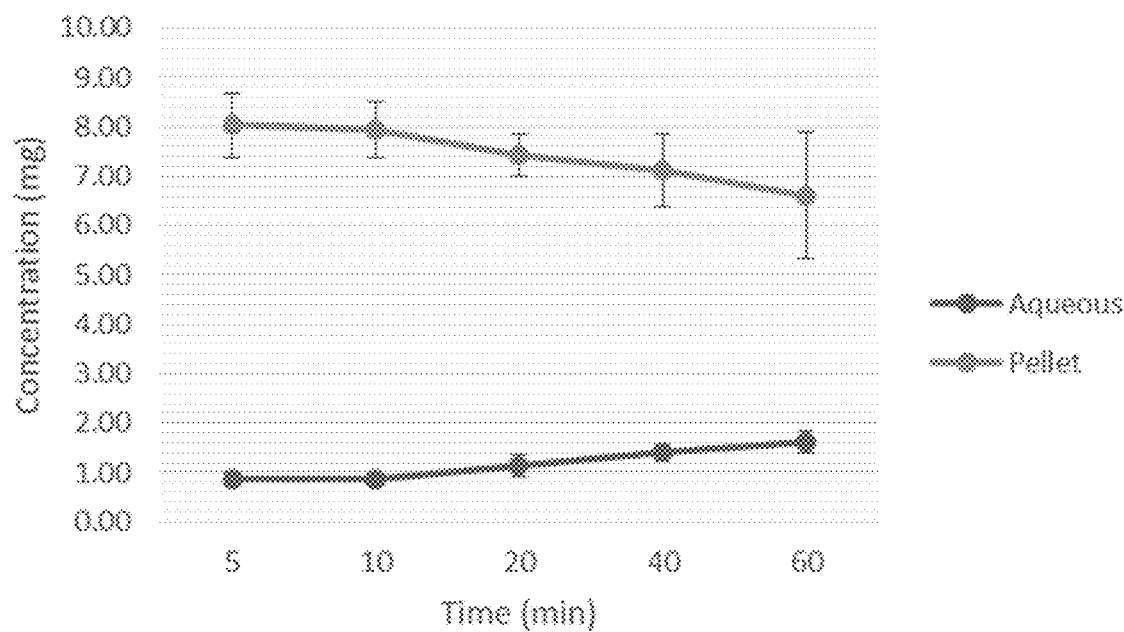
FIG. 2—Solubilisation of CBD in the presence of TPM during in vitro gastro-intestinal digestion of carrier oil (MCT, LCT/LCFA, or a mixture of MCT:LCT/LCFA) in fasted media. Total lipid was 110 mg (80-90 mg carrier oil+10 mg CBD+10-20 mg TPM). Data are mean±SD, n=3. A. CBD concentration (mg) during digestion in MCT with TPM. B. CBD concentration (mg) during digestion in LCT/LCFA (Maisine CC) with TPM. C. CBD concentration (mg) during digestion in a mixture of MCT:LCT/LCFA (Maisine CC) with TPM.
Figure 2:
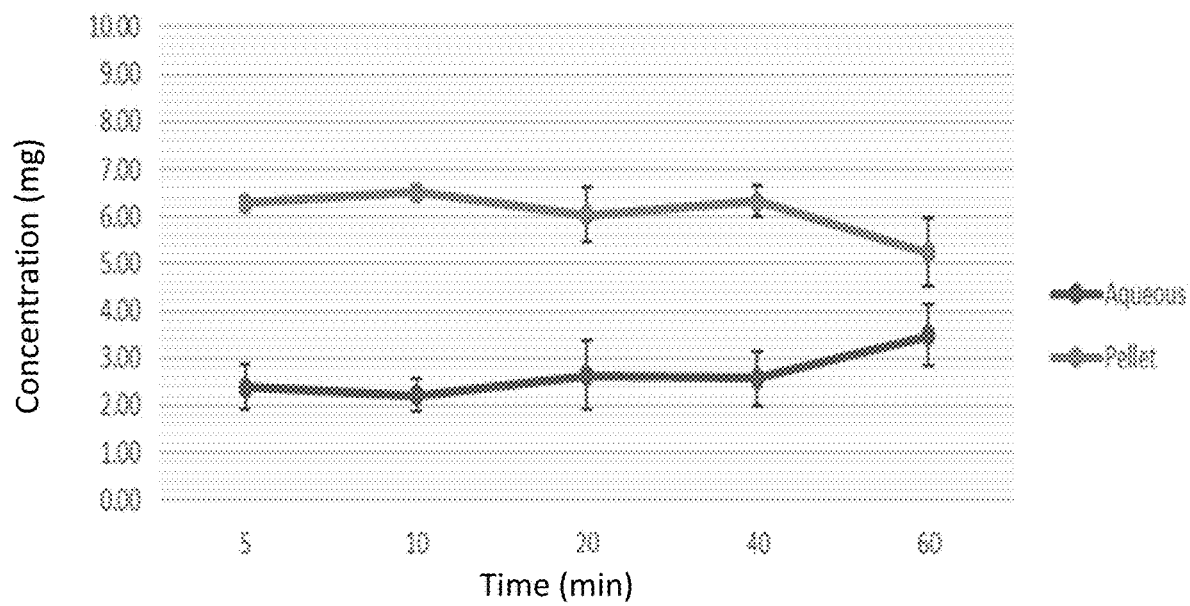

The addition of TPM to the MCT carrier oil, or TPM to the LCT/LCFA carrier oil did not increase the in-vitro solubility of CBD during digestion (FIG. 2) in this model.

Interestingly, the addition of TPM increased the aqueous solubility of CBD during digestion for the mixture of MCT and LCT/LCFA (FIG. 2C). This formulation would be predicted to have better bioavailability in-vivo than CBD dissolved in MCT alone.

Figure 3:
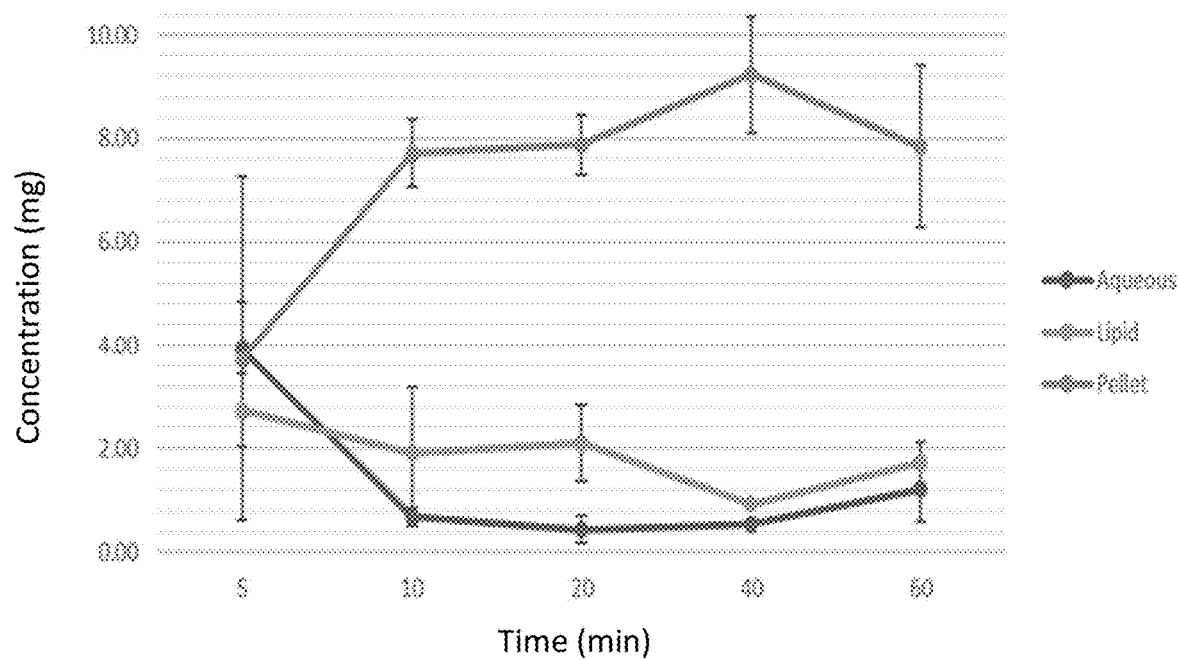
FIG. 3—Solubilisation of CBD in the presence of TPM during in vitro digestion of carrier oil (MCT, LCT/LCFA, or a mixture of MCT:LCT/LCFA) in fasted media (pH 6.5). Total lipid was 110 mg (80-90 mg carrier oil+10 mg CBD+10-20 mg TPM). Data are mean±SD, n=3. A. CBD concentration (mg) during digestion in 3:1 MCT:LCT/LCFA, with TPM. B. CBD concentration (mg) during digestion in 1:1 MCT:LCT/LCFA, with TPM. C. CBD concentration (mg) during digestion in 1:3 MCT:LCT/LCFA, with TPM.
Figure 3:
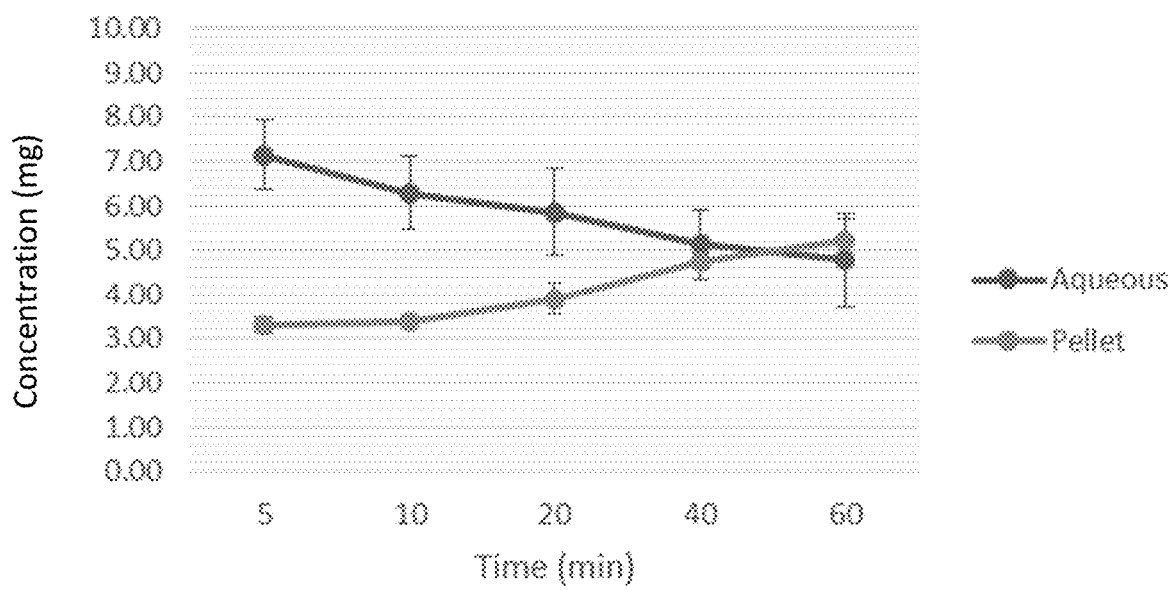

When the ratio of the MCT:LCT/LCFA is examined, it can be seen that vehicle comprising 1:1 MCT:LCT/LCFA leads to the best increase in aqueous CBD solubility (FIG. 3). Formulations with an increased MCT ratio (3:1 MCT: LCT/LCFA) lead to CBD precipitation during digestion. Formulations with an increased LCT/LCFA ratio (1:3 MCT: LCT/LCFA) lead to a slight increase in aqueous CBD, but also a significant amount of CBD dissolved in an immiscible oil phase. From the results obtained, an oil vehicle with a MCT:LCT/LCFA ratio of 1:1 produces the highest amount of aqueous CBD and would be predicted to have the best in-vivo bioavailability.

Example 2—In-Vitro Rat Lipolysis

One limitation of the above model of intestinal solubility of cannabidiol is that it is limited to conditions that model the intestinal environment. In contrast, bioavailability is also a function of pre-intestinal, gastric digestion. The dispersion of solubilised drug in gastric conditions is a factor indicating likely intestinal drug absorption and bioavailability.

Further in-vitro lipolysis experiments were conducted to investigate CBD dispersibility and solubility in a model of the gastric and intestinal spaces. The effect of TPM and the formulation vehicle was assessed by comparison to CBD dissolved in an MCT vehicle at 100 mg/ml. A rat gastric-intestinal model was selected in order to have best correlation with a subsequent in-vivo pk study in rats.

The in vitro lipolysis experiment simulated rat gastrointestinal conditions. The dispersion study was done in a lipolysis vessel containing simulated rat gastric medium at pH 2.4 and the gastric digestion of the formulations was assessed during 30 min. Afterwards, a concentrated bile buffer together with pancreatin was added to the gastric medium leading to the final concentrations which simulated the rat intestinal conditions. Subsequently, lipid digestion and drug solubilization was evaluated for 60 min.

Figure 4:
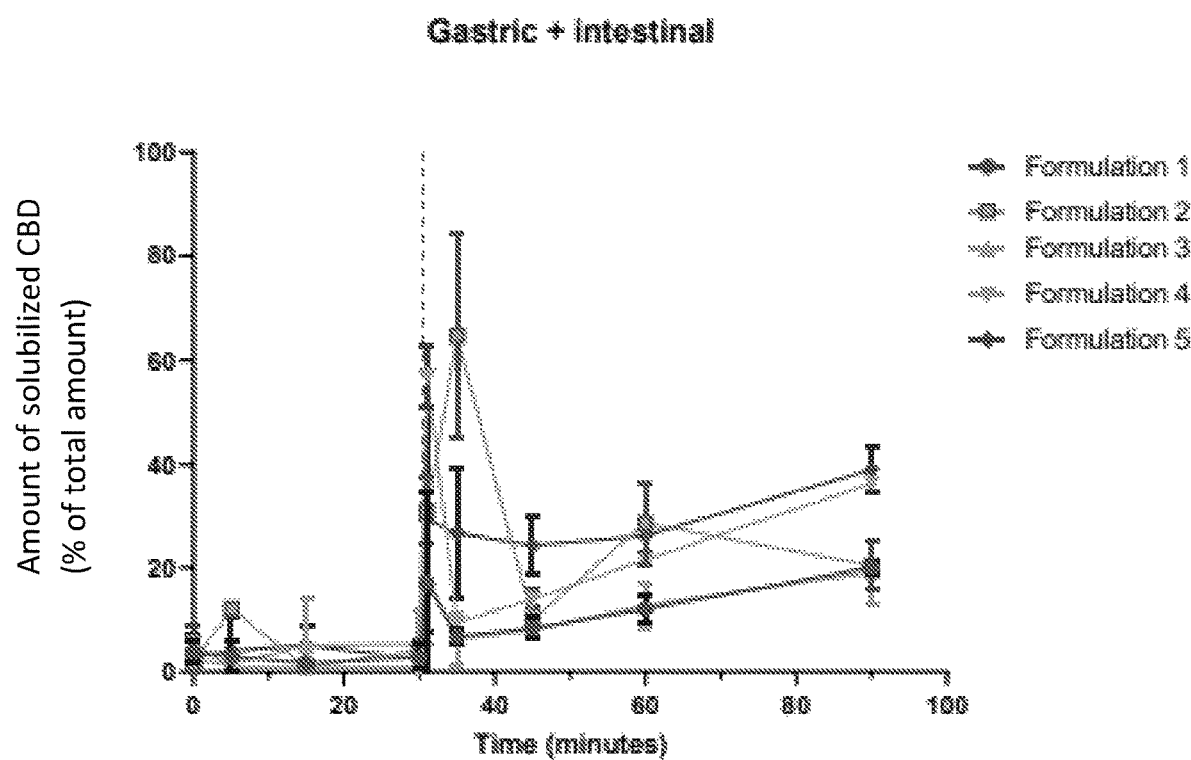
FIG. 4. CBD solubility in-vitro in simulated gastric (0-30 min) and intestinal (30-90 min) conditions. Group 1: MCT. Group 2: 50 mg/ml TPM in MCT. Group 3: 100 mg/ml TPM in MCT. Group 4: 100 mg/ml TPM in 1:1 MCT/Maisine CC. Group 5: 200 mg/ml TPM in 1:1 MCT/Maisine CC.

The addition of TPM to MCT containing CBD (100 mg/ml) increased the dispersibility and solubility of CBD in both the simulated gastric and intestinal spaces (FIG. 4). In group 3, it was noted that at higher concentrations of TPM, some TPM was not dissolved and on this basis a titrated effect is not observed over group 2, particularly at the end of intestinal digestion.

The addition of TPM to MCT:LCT/LCFA vehicles containing CBD (100 mg/ml) also increased the dispersibility and solubility of the CBD in the intestinal space. It was observed that 100 mg/ml TPM more readily dissolved in a formulation vehicle containing LCT/LCFA (group 4) than in a vehicle without LCT/LCFA (group 3), indicating an increased capacity for TPM-mediated dissolution of CBD in LCT/LCFA-containing formulations. This effect became less apparent at concentrations of TPM of 200 mg/ml or more, hence explaining the absence of a clear titrated effect of group 5 over group 4 at the completion of intestinal digestion. The data suggests that TPM concentrations of 200 mg/ml or greater may require a greater amount of LCT/LCFA to ensure TPM solubility, and in particular a ratio of LCT/LCFA to MCT of greater than 1:1. Alternatively more CBD could be added at the LCT/LCFA:MCT ratio of 1:1.

All test groups (apart from group 3 as previously noted) generally showed a higher solubilisation of CBD compared to the CBD/MCT vehicle at the completion of 60 minutes of intestinal digestion. TPM therefore increases the solubility of CBD during gastric and intestinal digestion in-vitro, and this predicts TPM as likely increasing the intestinal absorption and bioavailability of CBD in vivo.

Example 3—In Vivo Bioavailability

Formulations that were tested in-vitro for CBD solubility were subsequently tested in-vivo.

Male Sprague-Dawley rats (301-353 g at the time of the study) are acclimatized for a minimum of seven days on standard feed with free access to water. The rats are housed under controlled environmental parameters (temperature: 22.1° C., relative humidity: 57%), and with reversed light cycle (12 h/12 h). Before starting the experiment, the animals are fasted for approximately 13 h in the inactive part of their cycle.

The study included five groups of six rats each as shown in the following table.

TABLE 1

| Group # | CBD (mg/ml) in MCT | MCT:LCT | TPM (mg/ml) | Mean CBD cMax | AUC |
|---|---|---|---|---|---|
| Control | 100 | — | — | 13.9 | 42.5 |
| 1 | 100 | 1:1 | 50 | 78.5 | 178.0 |
| 2 | 100 | 1:1 | 100 | 188.2 | 653.1 |
| 3 | 100 | 1:1 | 100 | 449.1 | 1783 |
| 4 | 100 | 1:1 | 200 | 565.7 | 1722 |

The formulations are administered to each rat by oral gavage with a polyurethane feeding tube (Instech Laboratories Inc., Plymouth Meeting, USA). Blood samples (200 µL) are collected from the tail vein before dosing and at 0, 0.5, 1, 2, 4, 6, and 8 h after dosing. After the 6 h blood sample, the rats were given access to standard feed. At 23 h, the rats are euthanized by gassing and a blood sample is withdrawn from the heart immediately after. All blood samples were collected in ethylenediaminetetraacetic acid (EDTA) tripotassium salt dihydrate coated tubes (Sarstedt, Helsingborg, Sweden), and centrifuged at 10,000 RPM for 10 min. After centrifugation, the plasma was transferred to polypropylene microtubes and stored at −20° C. until LC-MS analysis.

Figure 5:
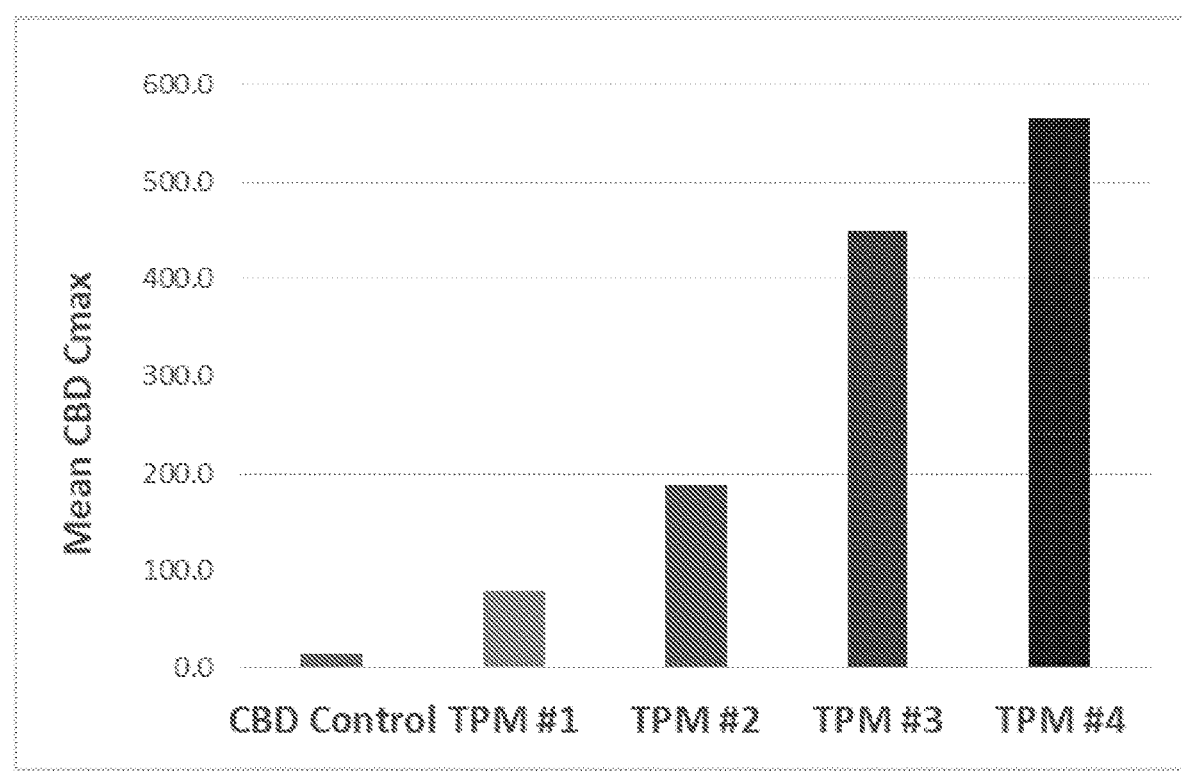
FIG. 5—Mean CBD Cmax after a single oral gavage of formulations containing CBD.
Figure 6:
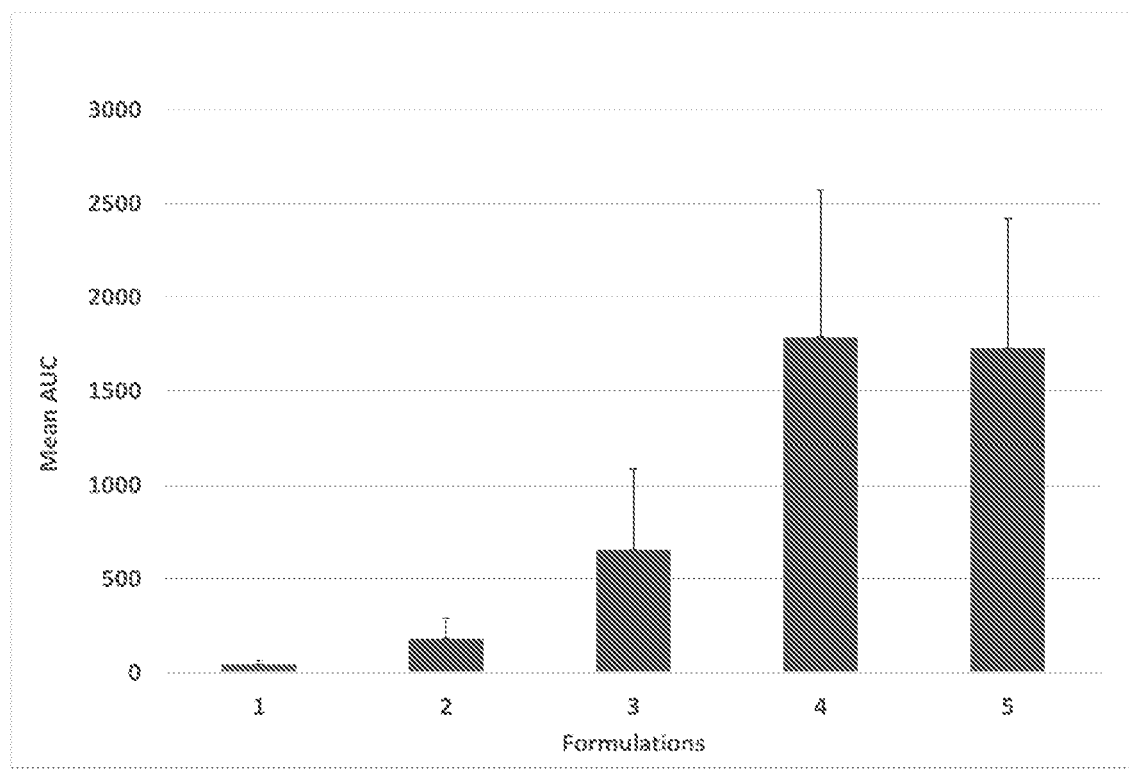
FIG. 6—Mean CBD AUC after a single oral gavage of formulations containing CBD.

The addition of TPM to MCT carriers increased the mean Cmax relative to the control CBD formulation in MCT alone (FIG. 5 and Table 1). Increases in Cmax were dependent on the TPM concentration. The addition of 50 mg/ml TPM increased the mean Cmax by ~5×, while the addition of 100 mg/ml TPM increased the mean Cmax by ~14 times. Similar increases in the area-under-the-curve were evident for the MCT formulations containing TPM (FIG. 6). Thus TPM is shown to increase the bioavailability of CBD in CBD/MCT carrier oil formulations.

The addition of TPM to MCT:LCT/LCFA carriers increased the mean Cmax relative to the control CBD formulation in MCT alone, as well as the CBD:TPM:MCT formulations (FIG. 5). Increases in Cmax were dependent on the TPM concentration. The addition of 100 mg/ml TPM increased the mean Cmax by ~30× relative to the control formulation in MCT alone, while the addition of 200 mg/ml TPM increased the mean Cmax by ~40 times. Similar increases in the area-under-the-curve were evident for the MCT:LCT/LCFA formulations containing TPM (FIG. 6).

As in Example 2, LCT was observed to enable greater dissolution of TPM, and this in turn is believed to result in a greater dissolution of CBD in TPM-containing formulation vehicles, thereby leading to improved bioavailability of CBD.

Further, the fatty acid chain length plays a key role in the emulsification, permeation, and route of absorption. The medium chain esters are known for rapid, hepatic absorption, whereas products consisting of unsaturated LCFA tend to stimulate chylomicron secretion and increased lymphatic uptake. The mixture of MCT and LCT fatty acids in combination with TPM, significantly increases the oral bioavailability of CBD in-vivo.

Example 4—In Vitro Digestion Model for Assessing Cannabinoid Solubility in Gastric and Intestinal Aqueous Fluid The solubility of various cannabinoids in formulations according to the invention in gastric and intestinal aqueous fluid is determined by in vitro digestion of cannabinoid formulation in in vitro aqueous gastric and intestinal fluid.

Cannabinoid formulations are prepared by dissolving appropriate amounts of cannabinoid in carrier oil (in LOT or a 1:1 mixture of MCT and LCT/LCFA), followed by addition of TPM as described in Table 2. Ultrasonication and brief heating in a water bath set to 50° C. is applied to dissolve TPM into the oils.

TABLE 2

| Formulation # | Volume (mL) | Cannabinoid | Cannabinoid (mg) | TPM (mg) | LCT/LCFA (mL) | MCT (mL) | Cannabinoid (mg/mL) | TPM (mg/mL) |
|---|---|---|---|---|---|---|---|---|
| 1 | 5 | CBG | 250 | 500 | 2.5 | 2.5 | 50 | 100 |
| 2 | 5 | CBC | 250 | 500 | 2.5 | 2.5 | 50 | 100 |
| 3 | 5 | CBND | 250 | 500 | 2.5 | 2.5 | 50 | 100 |
| 4 | 5 | THC | 250 | 500 | 2.5 | 2.5 | 50 | 100 |
| 5 | 5 | CBN | 250 | 500 | 2.5 | 2.5 | 50 | 100 |
| 6 | 5 | CBT | 250 | 500 | 2.5 | 2.5 | 50 | 100 |
| 7 | 5 | CBE | 250 | 500 | 2.5 | 2.5 | 50 | 100 |
| 8 | 5 | CBL | 250 | 500 | 2.5 | 2.5 | 50 | 100 |
| 10 | 5 | CBCN | 250 | 500 | 2.5 | 2.5 | 50 | 100 |
| 11 | 5 | CBD | 250 | 500 | 2.5 | 2.5 | 50 | 100 |
| 12 | 5 | THCV | 250 | 500 | 2.5 | 2.5 | 50 | 100 |
| 13 | 5 | CBGA | 250 | 500 | 2.5 | 2.5 | 50 | 100 |
| 14 | 5 | CBCN | 250 | 500 | 2.5 | 2.5 | 50 | 100 |
| 15 | 5 | CBDA | 250 | 500 | 2.5 | 2.5 | 50 | 100 |
| 16 | 5 | CBDV | 250 | 500 | 2.5 | 2.5 | 50 | 100 |

The gastric medium (pH2.4) is formulated as in Table 3:

TABLE 3

| Composition* | Concentration (mM) |
|---|---|
| NaCl (Merck) | 111.7 |
| Bovine bile (Fluka) | 1.3 |
| Phospholipid (lecithin Lipoid S PC) | 0.8 |

*Added to the composition are 1 mL of pepsin stock (porcine gastric mucosa (450 U/mL of gastric medium) (Sigma-Aldrich) and 1 ml of lipase (Rhizopus Oryzae, (50 TBU/mL of gastric medium) (Sigma-Aldrich)).

A concentrated bile buffer (pH 8.1) is formulated as in Table 4

TABLE 4

| Composition | Concentration (mM) |
|---|---|
| NaCl (Merck) | 133.66 |
| Bovine bile (Fluka) | 64.684 |
| Phospholipid (lecithin Lipoid S PC) | 8.862 |
| Hepes (Sigma) | 47.26 |
| $CaCl_2$ (Sigma-Aldrich) | 3.892 |

5 mL of cannabinoid formulation is added to 18 mL of gastric medium (pH2.4) and maintained for 5 minutes to enable dispersion. Pepsin and lipase are added to final activities of 450 and 50 U/mL respectively establishing time point zero. Samples are taken at 0, 5, 15 and 30 minutes.

At 30 minutes, concentrated bile buffer and 5 mL pancreatin (Pancreatic lipase (to 179 U/mL of medium) (Sigma-Aldrich) is added to gastric medium to establish an intestinal medium of pH 7.5 as in Table 5.

TABLE 5

| Composition* | Concentration (mM) |
|---|---|
| NaCl (Merck) | 119.6 |
| Bovine bile (Fluka) | 24.1 |
| Phospholipid (lecithin Lipoid S PC) | 3.7 |
| Hepes (Sigma) | 17 |
| $CaCl_2$ (Sigma-Aldrich) | 1.4 |

Samples of 0.55 mL are taken at 31, 35, 45, 60 and 90 minutes.

An assessment of total sample is done by pipetting 250 µL of homogenous sample into a 1.5 mL Eppendorf tube containing 1000 µL acetonitrile and 225 µL 0.5 M HCl. This is subsequently centrifuged at 10,000 rpm for 5 minutes and the supernatant is analyzed for cannabinoid content using HPLC-UV.

Solubilised drug sample is assessed by adding a homogenous sample of 250 µL wto 7 µL 4-bromobenzene boronic acid solution (1 M in methanol; enzyme inhibitor), and subjected to ultracentrifugation (30 min at 100,000 rpm, 37° C.) in an Optima MAXXP ultracentrifuge (Beckman Coulter, Brea, CA, USA). Subsequently, 200 µL of the supernatant is pipetted into a 1.5 mL Eppendorf tube containing 1000 µL acetonitrile and 225 µL 0.5 M HCl. The Eppendorf tube is centrifuged for 10,000 rpm for 5 minutes and the supernatant analyzed for cannabinoid content using HPLC-UV.

Samples are analyzed on a Dionex 3000 HPLC equipment fitted with a Phenomenex Luna, 5µ C18(2), 100A, 150×4.60, 5 µm column (P/NO 00F-4252-E0). Separation is obtained with isocratic elution of an 80:20 mixture of acetonitrile and purified water using the settings in Table 6:

TABLE 6

| Flow: | 0.5 mL/min |
|---|---|
| Column temp: | 30° |
| Autosampler temp.: | 22° |
| Detection wavelength | 220 nm |
| Run time: | 8 minutes |

The results for each cannabinoid test sample are compared to a matched cannabinoid control which contains the same cannabinoid and carrier oil in same amounts as the test sample but does not contain TPM. An at least 0.5 fold increase in solubility of the cannabinoid as determined by HPLC of the test sample compared to the matched control indicates the sample as having an improved gastro-intestinal solubility and predicts a higher likelihood of improved in vivo gastro-intestinal solubility, higher cMax and or greater AUC than the matched control.

In this model, the amount of cannabinoid to be assessed may be adjusted. Greater amounts of cannabinoid than those stated in Table 2 will generally require a greater amount of TPM (for example 200 mg/mL of TPM or more), or an increased amount of LCT/LCFA.

Example 5—Solubility of TPM in Oil Formulations

The solubility of TPM in a range of solvents was determined.

Experimental

Materials

Maisine CC [Gattefosse SAS, Saint-Priest France]
Labrafac CC [Gattefosse SAS, Saint-Priest France]
Labrafac Lipohile WL 1349 [Gattefosse SAS, Saint-Priest France]
Captex®300 [Abitec corp, WI, USA]
Captex®355 [Abitec corp, WI, USA]
Soybean oil [Sigma, St Louis, MO, USA]
Peanut oil [Sigma, St Louis, MO, USA]
PEG 400 [Aldrich, St Louis, MO, USA]
Propylene Glycol [Sigma Aldrich, St Louis, MO, USA]
Glycerol [Merck, Victoria, Australia]
Fractionated oils (MCT Oil from coconut) [Coco earth, NSW, Australia]
Tocopheryl phosphate mixture (TPM) [Avecho Biotechnology, Victoria, Australia]

Equipment

Glass scintillation vials (20 mL) [Rowe Scientific, VIC, Australia]
Teflon-coated Magnetic rods [Rowe Scientific, Victoria, Australia]
Multi-stirrer [Velp, Germany]
Balance (5 digits) (Mettler Toledo Excellence Plus XP205)
Positive Displacement pipettes (Ranin, Mettler Toledo, Vic, Australia)
Positive Displacement pipette tips [Mettler Toledo Bio-Clean Disposable Capillaries/Pistons]
Stainless Steel Spatula [Rowe Scientific, VIC, Australia]
Ratek Water Bath [Rowe Scientific, Victoria, Australia]

Solubility Testing

TPM was accurately weighed into a 20 ml glass scintillation vial according to table 1. A magnetic stirring rod was added to the vial and the total weight recorded (TPM+Vial+magnetic rod). The vials were placed on multi-head magnetic stirrers.

Aliquots of 500 uL solvent were added every 10 minutes to the powder with stirring at 25° C. When the solution was about to become clear the aliquots volume was dropped to 100 uL every 20 minutes. Solvent was added until all TPM powder was completely dissolved. Vials were left overnight at 25° C. without stirring to ensure no crystallisation occur in the solution. The final vial weight was recorded (Total) and used to calculate how much solvent was required to dissolve X gm TPM.

Same procedure was repeated keeping the vials in water bath at 45° C. in order to determine TPM solubility at 40° C.

Results

TPM solubility in the tested solvents is presented in Tables 7 and 8 below. TPM solubility at 25° C. ranged from 0.06-8.62% w/w. the highest solubility of TPM was in Maisine CC. TPM solubility in Captex, Labrafac and MCT oil was between 1.29 to 2.21% w/w. TPM solubility was in soybean oil, peanut oil, PEG 400, Glycerol and Propylene Glycol was less than 0.1% w/w.

Increasing the temperature to 45° C. increased the solubility of TPM in all solvents tested. Absolute increases in solubility were from 0.10% up to 2.13%. The maximum solubility increase was observed using Labrafac WL 1349 and the minimum was Glycerol. It was noted that when TPM solutions were brought to room temperature it took less than 30 minutes to show TPM precipitation in PEG 400, Propylene Glycol and Glycerol while it took over 24 hours to show precipitation in the rest of the solvents.

TABLE 7

Solubility of TPM in Various Solvents at 25° C.

| Solvent | Carbons | TPM (gm) | TPM + Flea + vial | Total | Solvent (gm) | Sol (% w/w) |
|---|---|---|---|---|---|---|
| Maisine CC | (C18:1 and C18:2) | 0.215 | 15.729 | 18.223 | 2.495 | 8.62 |
| Labrafac CC | C8 and C10 | 0.212 | 16.444 | 24.389 | 7.944 | 2.67 |
| Labrafac WL 1349 | C8 (70%) C10 (20%) | 0.200 | 15.866 | 23.894 | 8.028 | 2.49 |
| Captex ® 300 | C8 (55%) C10 (35%) | 0.213 | 15.944 | 27.836 | 11.892 | 1.79 |
| Captex ® 355 | C8-12 | 0.199 | 15.892 | 24.874 | 8.983 | 2.21 |
| MCT Oil | C8-C10 | 0.194 | 15.999 | 30.994 | 14.995 | 1.29 |
| Soybean oil | (C18:1 and C18:2) | 0.023 | 15.785 | 34.725 | 18.939 | 0.12 |
| Peanut oil | C2 | 0.018 | 15.778 | 34.833 | 19.055 | 0.09 |
| PEG 400 | C3 | 0.020 | 15.691 | 39.043 | 23.352 | 0.08 |
| Propylene Glycol | C3 | 0.017 | 16.355 | 39.937 | 23.582 | 0.07 |
| Glycerol | | 0.016 | 15.659 | 39.542 | 23.883 | 0.07 |

TABLE 8

Solubility of TPM in Various Solvents at 45° C.

| Solvent | TPM (gm) | TPM + Flea + vial | Total | Solvent (gm) | Sol (% w/w) |
|---|---|---|---|---|---|
| Maisine CC | 0.210 | 16.061 | 18.211 | 2.150 | 9.79 |
| Labrafac CC | 0.201 | 15.989 | 20.618 | 4.629 | 4.35 |
| Labrafac WL 1349 | 0.208 | 15.887 | 20.378 | 4.491 | 4.62 |
| Captex ® 300 | 0.197 | 16.015 | 22.531 | 6.515 | 3.03 |
| Captex ® 355 | 0.207 | 16.026 | 22.118 | 6.092 | 3.40 |
| MCT Oil | 0.202 | 15.972 | 26.318 | 10.347 | 1.95 |
| Soybean oil | 0.020 | 15.663 | 24.253 | 8.590 | 0.24 |
| Peanut oil | 0.021 | 15.785 | 21.653 | 5.868 | 0.36 |
| PEG 400 | 0.021 | 16.337 | 34.455 | 18.118 | 0.12 |
| Propylene Glycol | 0.022 | 15.540 | 32.477 | 16.937 | 0.13 |
| Glycerol | 0.021 | 15.568 | 35.577 | 20.009 | 0.10 |

The invention claimed is:

1. An oral cannabinoid formulation comprising:
   a cannabinoid component comprising:
      a cannabinoid;
      a carrier in the form of long chain triglyceride (herein LCT) or long chain fatty acid (LCFA);
   a tocopheryl phosphate component comprising:
      mono-(tocopheryl) phosphate (herein TP) and di-(tocopheryl) phosphate (herein T2P);
   wherein the mass ratio of the cannabinoid to the tocopheryl phosphate component is about 10:1 to 1:10.

2. The formulation of claim 1 wherein the mass ratio of the cannabinoid to the tocopheryl phosphate component is about 5:1 to 1:5.

3. The formulation of claim 2 wherein, the mass ratio of the cannabinoid to the tocopheryl phosphate component is about 2:1 to 1:2.

4. The formulation of claim 1 wherein the LCT or LCFA is a naturally occurring oil or an extract that has been purified or fractionated thereby increasing the relative abundance of one or more linear or branched alkyl chains comprising 13 or more carbon atoms in the oil or extract.

5. The formulation of claim 1 wherein the cannabinoid component further comprises:
a carrier in the form of medium chain triglyceride (herein MCT).

6. The formulation of claim 5 wherein the mass ratio of MCT to LCT or LCFA is 3:1 to 1:3.

7. The formulation of claim 6 wherein the mass ratio of MCT to LCT or LCFA is 1:1.

8. The formulation of claim 1 wherein the mass ratio of LCT or LCFA to the tocopheryl phosphate component is from 5:1 to 250:1.

9. The formulation of claim 1 wherein the formulation comprises cannabinoid in an amount of about 1 to 250 mg/ml.

10. The formulation of claim 1 wherein the mass ratio of cannabinoid to carrier is about 1:3 to 1:1000 respectively.

11. The formulation of claim 1 wherein the cannabinoid is cannabidiol (CBD) or tetrahydrocannabinol (herein THC).

12. The formulation of claim 11 wherein the cannabinoid is CBD.

13. The formulation of claim 1 wherein the mass ratio of TP to T2P is about 2:1.

14. The formulation of claim 1 wherein the formulation is provided in the form of a plurality of dosage units adapted for oral administration.

15. A dosage unit adapted for oral administration and formed from a formulation of claim 1 wherein the dosage unit comprises an amount of cannabinoid of about 1 to 250 mg.

16. The dosage unit of claim 15, wherein the unit is a tablet, caplet, capsule, chewable gum, or liquid adapted for oral administration.

17. A method for providing an individual with a plasma concentration of cannabinoid, the method comprising the step of:
oral administration of a treatment formulation to an individual, the treatment formulation as defined in claim 1,
wherein the plasma concentration of cannabinoid provided in the individual by oral administration of the treatment formulation is greater than that obtained by oral administration of a control formulation, wherein the control formulation is the same as the treatment formulation but does not comprise the tocopheryl phosphate component of the treatment formulation.

18. The method of claim 17 wherein the cannabinoid is CBD or THC.

19. A method of increasing the duration of a therapeutically effective plasma concentration of a cannabinoid in plasma of an individual, the method comprising the step of:
oral administration of a treatment formulation to an individual, the treatment formulation as defined in claim 1,
wherein the duration of a therapeutically effective plasma concentration of a cannabinoid in plasma in the individual by oral administration of the treatment formulation is greater than that obtained by oral administration of a control formulation, wherein the control formulation is the same as the treatment formulation but does not comprise the tocopheryl phosphate component of the treatment formulation.

20. The method of claim 19 wherein the cannabinoid is CBD or THC.

* * * * *